United States Patent
Hoeck, III et al.

(10) Patent No.: US 12,446,662 B2
(45) Date of Patent: Oct. 21, 2025

(54) ADDITIVELY MANUFACTURED FOOTWEAR

(71) Applicant: adidas AG, Herzogenaurach (DE)

(72) Inventors: John L. Hoeck, III, Lake Oswego, OR (US); Christopher N. Padilla, Portland, OR (US); Stephen P. Dobson, Portland, OR (US); Christian Manuel Arias Delgado, Portland, OR (US); Niccolo Dambrosio, Portland, OR (US)

(73) Assignee: adidas AG, Herzogenaurach (DE)

( * ) Notice: Subject to any disclaimer, the term of this patent is extended or adjusted under 35 U.S.C. 154(b) by 20 days.

(21) Appl. No.: 18/405,739

(22) Filed: Jan. 5, 2024

(65) Prior Publication Data
US 2025/0221493 A1  Jul. 10, 2025

(51) Int. Cl.
| | | |
|---|---|---|
| *A43B 1/00* | (2006.01) | |
| *A43B 23/02* | (2006.01) | |
| *B29C 64/188* | (2017.01) | |
| *B29C 64/20* | (2017.01) | |
| *B33Y 40/20* | (2020.01) | |
| *B33Y 80/00* | (2015.01) | |

(Continued)

(52) U.S. Cl.
CPC ........... *A43B 23/0205* (2013.01); *A43B 1/00* (2013.01); *B29C 64/188* (2017.08); *B29C 64/20* (2017.08); *B33Y 40/20* (2020.01); *B33Y 80/00* (2014.12); *B29L 2031/50* (2013.01); *B33Y 10/00* (2014.12)

(58) Field of Classification Search
CPC ...... A43B 23/0205; A43B 1/00; A43B 1/0009
See application file for complete search history.

(56) References Cited

U.S. PATENT DOCUMENTS

| | | |
|---|---|---|
| 354,693 A | 12/1886 | Dick |
| 1,111,437 A | 9/1914 | Butterfield |
| (Continued) | | |

FOREIGN PATENT DOCUMENTS

| | | |
|---|---|---|
| CN | 101611953 A | 12/2009 |
| CN | 102578760 A | 7/2012 |
| (Continued) | | |

OTHER PUBLICATIONS

International Search Report and Written Opinion of the International Searching Authority directed to International Patent Application No. PCT/IB2025/050079, mailed Apr. 8, 2025; 10 pages.

(Continued)

*Primary Examiner* — Marie D Bays
(74) *Attorney, Agent, or Firm* — Sterne, Kessler, Goldstein & Fox P.L.L.C.

(57) ABSTRACT

Additively manufactured articles of footwear comprising a sole portion and an upper portion 3D printed as a single piece. In some embodiments, the article of footwear can comprise an outer skin comprising a plurality of continuous beams extending adjacent to each other and defining at least part of an outer contour of the upper portion, at least part of an outer contour of the sole portion, or both. In some embodiments, the article of footwear can comprise an inner skin comprising a network of beams defining at least part of an inner contour of the upper portion. In some embodiments, the article of footwear can comprise a core structure that connects beams of the outer skin to beams of the inner skin.

16 Claims, 21 Drawing Sheets

(51) Int. Cl.
  *B29L 31/50* (2006.01)
  *B33Y 10/00* (2015.01)

(56) References Cited

U.S. PATENT DOCUMENTS

| | | | |
|---|---|---|---|
| 2,205,356 A | 6/1940 | Rose et al. |
| 2,853,809 A | 9/1958 | Carlo |
| 3,253,601 A | 5/1966 | Scholl |
| 3,416,174 A | 12/1968 | Novitske |
| 3,793,750 A | 2/1974 | Bowerman |
| 4,012,855 A | 3/1977 | Gardner |
| 4,271,606 A | 6/1981 | Rudy |
| 4,297,796 A | 11/1981 | Stirtz et al. |
| 4,309,831 A | 1/1982 | Pritt |
| 4,378,643 A | 4/1983 | Johnson |
| D272,963 S | 3/1984 | Muller et al. |
| 4,439,936 A | 4/1984 | Clarke et al. |
| 4,607,440 A | 8/1986 | Roberts et al. |
| 4,774,774 A | 10/1988 | Allen, Jr. |
| 5,236,637 A | 8/1993 | Hull |
| 5,337,492 A | 8/1994 | Anderie et al. |
| 5,367,791 A | 11/1994 | Gross et al. |
| 5,391,072 A | 2/1995 | Lawton et al. |
| 5,423,135 A | 6/1995 | Poole et al. |
| 5,529,473 A | 6/1996 | Lawton et al. |
| 5,799,417 A | 9/1998 | Burke et al. |
| 5,862,614 A | 1/1999 | Koh |
| 5,930,916 A | 8/1999 | Connor |
| 5,983,529 A | 11/1999 | Serna |
| 5,985,383 A | 11/1999 | Allen et al. |
| 6,014,821 A | 1/2000 | Yaw |
| 6,021,588 A | 2/2000 | Alviso |
| 6,076,283 A | 6/2000 | Boie |
| 6,259,962 B1 | 7/2001 | Gothait |
| 6,367,172 B2 | 4/2002 | Hernandez |
| 6,665,958 B2 | 12/2003 | Goodwin |
| 6,763,611 B1 | 7/2004 | Fusco |
| 7,383,647 B2 | 6/2008 | Chan et al. |
| 7,438,846 B2 | 10/2008 | John |
| 7,676,955 B2 | 3/2010 | Dojan et al. |
| 7,704,430 B2 | 4/2010 | Johnson et al. |
| 7,892,474 B2 | 2/2011 | Shkolnik et al. |
| 8,110,135 B2 | 2/2012 | El-Siblani |
| 8,191,284 B2 | 6/2012 | Cho |
| 8,522,454 B2 | 9/2013 | Schindler et al. |
| 8,739,639 B2 | 6/2014 | Owings et al. |
| 8,776,396 B2 | 7/2014 | Huynh |
| 9,205,601 B2 | 12/2015 | DeSimone et al. |
| 9,211,678 B2 | 12/2015 | DeSimone et al. |
| 9,216,546 B2 | 12/2015 | DeSimone et al. |
| 9,320,316 B2 | 4/2016 | Guyan et al. |
| 9,453,142 B2 | 9/2016 | Rolland et al. |
| D789,060 S | 6/2017 | Guyan et al. |
| 9,756,899 B2 | 9/2017 | Waatti |
| D809,752 S | 2/2018 | Campbell |
| 9,930,929 B2 | 4/2018 | Cooper et al. |
| 10,010,133 B2 | 7/2018 | Guyan |
| 10,010,134 B2 | 7/2018 | Guyan |
| 10,016,013 B2 | 7/2018 | Kormann et al. |
| 10,034,516 B2 | 7/2018 | Gheorghian et al. |
| 10,039,343 B2 | 8/2018 | Guyan |
| D829,425 S | 10/2018 | Albrecht et al. |
| D831,315 S | 10/2018 | Mahoney |
| 10,104,934 B2 | 10/2018 | Guyan |
| D841,300 S | 2/2019 | Albrecht et al. |
| D841,301 S | 2/2019 | Albrecht et al. |
| 10,231,511 B2 | 3/2019 | Guyan et al. |
| 10,259,171 B2 | 4/2019 | Robeson et al. |
| D847,481 S | 5/2019 | Albrecht et al. |
| D857,362 S | 8/2019 | Thompson |
| D859,801 S | 9/2019 | Jenkins et al. |
| D862,051 S | 10/2019 | Goussev et al. |
| D862,866 S | 10/2019 | Albrecht et al. |
| 10,426,226 B2 | 10/2019 | Guyan et al. |
| 10,434,706 B2 | 10/2019 | Robeson et al. |
| D873,546 S | 1/2020 | Henrichot |
| D876,056 S | 2/2020 | Henrichot |
| D878,016 S | 3/2020 | Henrichot |
| D879,428 S | 3/2020 | Braun et al. |
| D879,434 S | 3/2020 | Fick et al. |
| 10,575,588 B2 | 3/2020 | Perrault et al. |
| D880,120 S | 4/2020 | Fick et al. |
| D880,122 S | 4/2020 | Fick et al. |
| D880,131 S | 4/2020 | Fick et al. |
| D882,227 S | 4/2020 | Braun et al. |
| 10,639,861 B2 | 5/2020 | Minh et al. |
| D890,485 S | 7/2020 | Perrault et al. |
| 10,806,208 B2 | 10/2020 | Büsgen et al. |
| D907,904 S | 1/2021 | Perrault et al. |
| 2002/0078598 A1 | 6/2002 | Bell |
| 2004/0087230 A1 | 5/2004 | Wildeman |
| 2006/0201028 A1 | 9/2006 | Chan et al. |
| 2007/0011914 A1 | 1/2007 | Keen et al. |
| 2007/0043582 A1 | 2/2007 | Peveto et al. |
| 2008/0289218 A1 | 11/2008 | Nakano |
| 2009/0013556 A1 | 1/2009 | Nishiwaki et al. |
| 2009/0126225 A1 | 5/2009 | Jarvis |
| 2009/0139112 A1 | 6/2009 | Garneau |
| 2009/0183392 A1 | 7/2009 | Shane |
| 2009/0293309 A1 | 12/2009 | Keating et al. |
| 2010/0122471 A1 | 5/2010 | Edington et al. |
| 2010/0170106 A1 | 7/2010 | Brewer et al. |
| 2010/0199520 A1 | 8/2010 | Dua et al. |
| 2010/0251565 A1 | 10/2010 | Litchfield et al. |
| 2010/0281714 A1 | 11/2010 | Carboy et al. |
| 2011/0099855 A1 | 5/2011 | Cho |
| 2012/0117825 A9 | 5/2012 | Jarvis |
| 2012/0178259 A1 | 7/2012 | Miyazaki et al. |
| 2012/0180335 A1 | 7/2012 | Mahoney |
| 2012/0186107 A1 | 7/2012 | Crary et al. |
| 2013/0118036 A1 | 5/2013 | Gibson |
| 2013/0145653 A1 | 6/2013 | Bradford |
| 2013/0171019 A1 | 7/2013 | Gessler et al. |
| 2013/0292862 A1 | 11/2013 | Joyce |
| 2013/0295212 A1 | 11/2013 | Chen et al. |
| 2014/0020191 A1 | 1/2014 | Jones et al. |
| 2014/0026773 A1 | 1/2014 | Miller |
| 2014/0029030 A1 | 1/2014 | Miller |
| 2014/0109441 A1 | 4/2014 | McDowell et al. |
| 2014/0150297 A1 | 6/2014 | Holmes et al. |
| 2014/0182170 A1 | 7/2014 | Wawrousek et al. |
| 2014/0223783 A1 | 8/2014 | Wardlaw et al. |
| 2014/0226773 A1 | 8/2014 | Toth et al. |
| 2014/0259779 A1 | 9/2014 | Hashish et al. |
| 2014/0259787 A1 | 9/2014 | Guyan et al. |
| 2014/0259788 A1 | 9/2014 | Dojan et al. |
| 2014/0259789 A1 | 9/2014 | Dojan et al. |
| 2014/0299009 A1 | 10/2014 | Miller et al. |
| 2014/0300675 A1 | 10/2014 | Miller et al. |
| 2014/0300676 A1 | 10/2014 | Miller et al. |
| 2014/0310991 A1 | 10/2014 | Greene et al. |
| 2015/0000161 A1 | 1/2015 | Peyton et al. |
| 2015/0033577 A1 | 2/2015 | Dahl et al. |
| 2015/0033579 A1 | 2/2015 | Barnes et al. |
| 2015/0033581 A1 | 2/2015 | Barnes et al. |
| 2015/0089841 A1 | 4/2015 | Smaldone et al. |
| 2015/0128448 A1 | 5/2015 | Lockyer |
| 2015/0181976 A1 | 7/2015 | Cooper et al. |
| 2015/0223560 A1 | 8/2015 | Wawrousek et al. |
| 2015/0245686 A1 | 9/2015 | Cross |
| 2015/0331402 A1 | 11/2015 | Lin et al. |
| 2015/0351493 A1 | 12/2015 | Ashcroft et al. |
| 2015/0360419 A1 | 12/2015 | Willis et al. |
| 2016/0051009 A1 | 2/2016 | Kormann et al. |
| 2016/0122493 A1 | 5/2016 | Farris et al. |
| 2016/0137839 A1 | 5/2016 | Rolland et al. |
| 2016/0160077 A1 | 6/2016 | Rolland et al. |
| 2016/0180440 A1 | 6/2016 | Dibenedetto et al. |
| 2016/0288376 A1 | 10/2016 | Sun et al. |
| 2016/0295971 A1 | 10/2016 | Arnese et al. |
| 2016/0324260 A1 | 11/2016 | Guyan |
| 2016/0324261 A1 | 11/2016 | Guyan |
| 2016/0346626 A1* | 12/2016 | Nürnberg ............... A63B 37/04 |
| 2016/0360828 A1 | 12/2016 | Guyan |

(56) References Cited

U.S. PATENT DOCUMENTS

| | | | |
|---|---|---|---|
| 2016/0374428 A1 | 12/2016 | Kormann et al. | |
| 2017/0129167 A1 | 5/2017 | Castanon | |
| 2017/0129169 A1 | 5/2017 | Batchelder et al. | |
| 2017/0150778 A1 | 6/2017 | Youngs et al. | |
| 2017/0360156 A1* | 12/2017 | Lussier | A43B 7/085 |
| 2018/0014606 A1 | 1/2018 | Mokos | |
| 2018/0070736 A1 | 3/2018 | Achten et al. | |
| 2018/0103719 A1 | 4/2018 | Chen | |
| 2018/0126630 A1 | 5/2018 | Panzer et al. | |
| 2018/0243976 A1 | 8/2018 | Feller | |
| 2018/0271211 A1 | 9/2018 | Perrault et al. | |
| 2018/0271213 A1* | 9/2018 | Perrault | A43B 13/141 |
| 2018/0290374 A1 | 10/2018 | Willis et al. | |
| 2018/0368518 A1 | 12/2018 | Re et al. | |
| 2019/0069632 A1 | 3/2019 | Meschter | |
| 2019/0098960 A1 | 4/2019 | Weisskopf et al. | |
| 2019/0125004 A1* | 5/2019 | Thomas | A43B 3/16 |
| 2019/0160733 A1 | 5/2019 | Mirkin et al. | |
| 2019/0216174 A1* | 7/2019 | O'Haire | D04C 1/02 |
| 2019/0223543 A1 | 7/2019 | Tamm et al. | |
| 2019/0223551 A1 | 7/2019 | Hoffer et al. | |
| 2019/0269200 A1 | 9/2019 | Tseng | |
| 2019/0289960 A1* | 9/2019 | Loveder | A43B 3/0057 |
| 2019/0307207 A1* | 10/2019 | Braithwaite | A43B 7/12 |
| 2020/0093221 A1 | 3/2020 | Caldwell et al. | |
| 2020/0156308 A1 | 5/2020 | Ramos et al. | |
| 2020/0329815 A1 | 10/2020 | Schmid | |
| 2021/0195989 A1 | 7/2021 | Iwasa et al. | |
| 2021/0195995 A1 | 7/2021 | Sakamoto et al. | |
| 2021/0197494 A1* | 7/2021 | Zhu | B29C 64/40 |
| 2022/0110406 A1 | 4/2022 | Salari-Sharif et al. | |
| 2022/0110407 A1 | 4/2022 | Hettinga et al. | |
| 2022/0110408 A1* | 4/2022 | Coonrod | A43B 13/16 |
| 2022/0264997 A1* | 8/2022 | Hatano | A43B 23/04 |
| 2023/0046685 A1 | 2/2023 | Sussmann | |
| 2024/0032649 A1 | 2/2024 | Corcoran-Tadd et al. | |
| 2024/0245165 A1* | 7/2024 | Chen | A43D 999/00 |

FOREIGN PATENT DOCUMENTS

| | | |
|---|---|---|
| CN | 203378623 U | 1/2014 |
| CN | 209391169 U | 9/2019 |
| CN | 209403686 U | 9/2019 |
| CN | 110859355 A | 3/2020 |
| EP | 0526892 A2 | 2/1993 |
| EP | 2564719 A1 | 3/2013 |
| EP | 2424398 B1 | 12/2015 |
| EP | 3013171 A1 | 5/2016 |
| EP | 3165109 A1 | 5/2017 |
| EP | 2564714 B1 | 7/2018 |
| EP | 3939462 A2 | 1/2022 |
| ES | 2442448 A1 | 2/2014 |
| ES | 2578730 A1 | 7/2016 |
| JP | 3192899 B2 | 7/2001 |
| JP | 2002238609 A | 8/2002 |
| JP | 2011251190 A | 12/2011 |
| JP | 2014151201 A | 8/2014 |
| JP | 3192899 U | 9/2014 |
| WO | WO-2010126708 A2 | 11/2010 |
| WO | WO-2014008331 A2 | 1/2014 |
| WO | WO-2014009587 A1 | 1/2014 |
| WO | WO-2014015037 A2 | 1/2014 |
| WO | WO-2014100462 A1 | 6/2014 |
| WO | WO-2015164234 A1 | 10/2015 |
| WO | WO-2015169941 A1 | 11/2015 |
| WO | WO-2015169942 A1 | 11/2015 |
| WO | WO-2016066750 A1 | 5/2016 |
| WO | WO-2017210298 A1 | 12/2017 |
| WO | WO-2021169804 A1 | 9/2021 |

OTHER PUBLICATIONS

"Adidas Breaks the Mould With 3D-Printed Performance Footwear," Adidas Group, [Retrieved on Oct. 7, 2015], Retrieved from the Internet: ( http://www.adidas-group.com/en/media/news-archive/press-releases/2015/adi-das-breaks-mould-3d-printed-performance-footwear/ ).

Green, D., Adidas is finally bringing 3D-printed shoes into the mainstream, Business Insider.com, Dennis Green, Retrieved from the Internet: (URL: https://www.businessinsider.com/adidas-releases-futurecraft-4d-shoe-2017-4/ commerce-on-business-insider), (Year: 2017).

Januszkiewicz, R., et al., "Layerless Fabrication With Continuous Liquid Interface Production," Proceedings of the National Academy of Sciences of the United States of America 113(42):11703-11708, National Academy of Sciences, United States (Oct. 2016).

Nikolic, I., Reebok Flexagon Training Shoes, Behance.net, Ilija Nikolic, Retrieved from the Internet (URL: https://www.behance.net/gallery/68953047/REEBOK-FLEXAGON-Training-Shoes?t-racking_source=curated_galleries_list) 2018, 10 pages.

Panetta., et al., "Elastic Textures for Additive Fabrication," ACM Transactions on Graphics 34(4), Article No. 135 (Aug. 2015).

Pearson, D., Adidas is giving Olympic athletes its first-ever 3D-printed shoes,Highsnobiety.com, Retrieved from the Internet: (URL: https://www.highsnobiety.com/2016/08/11/adidas-3d-printed-shoes-olympics/), (Year: 2016).

Reebok Flexagon, Retrieved from the Internet (URL: https://www.reebok.com/us/reebok-flexagon/CN2583.html ), 2018.

Richard, B., Here's what 3D printed Future Craft adidas Yeezy boosts would look like Yeezys geared up for the future Retrieved from the Internet: (URL: https://solecollector.com/news/2015/11/adidas-yeezy-futurecraft-3d-print ), (Year: 2015).

Tumbleston, J.R., et al., "Continuous Liquid Interface Production of 3d Objects," Science 347(6228):1349-1352, American Association for the Advancement of Science, United States (Mar. 2015).

Worman, C., Top Tennis Shoes Featuring a 6-Month Outsole Warranty, Retrieved from the Internet (URL: https://blogs.tennisexpress.com/blogs/top-tennis-shoes-featuring-a-6-month-outsole-warranty/), (Year: 2018), 11 pages.

\* cited by examiner

ADDITIVELY MANUFACTURED FOOTWEAR

FIELD

The described embodiments generally relate to additively manufactured (3D printed) articles of footwear. More particularly, described embodiments relate to additively manufactured footwear comprising an upper portion and sole portion additively manufactured as a single piece.

BACKGROUND

The human foot is a complex and remarkable piece of machinery, capable of withstanding and dissipating many impact forces. The natural padding of fat at the heel and forefoot, as well as the flexibility of the arch, help to cushion the foot. Although the human foot possesses natural cushioning and rebounding characteristics, the foot alone is incapable of effectively overcoming many of the forces encountered during everyday activity. Unless an individual is wearing shoes that provide proper cushioning and support, the soreness and fatigue associated with every day activity is more acute, and its onset may be accelerated.

Individuals are often concerned with the amount of cushion and support an article of footwear provides. This is true for articles of footwear worn for non-performance activities, such as a leisurely stroll, and for performance activities, such as running, because throughout the course of an average day, the feet and legs of an individual are subjected to substantial impact forces. When an article of footwear contacts a surface, considerable forces may act on the article of footwear and, correspondingly, the wearer's foot. The upper of an article of footwear functions, in part, to provide cushioning to the wearer's foot and to protect it from these forces.

Proper footwear should be durable, comfortable, and provide other beneficial characteristics for an individual. Therefore, a continuing need exists for innovations in footwear.

BRIEF SUMMARY

Embodiments according to present disclosure are directed to articles of footwear comprising a sole portion and an upper portion integrally formed a single piece. The sole portion, upper portion, or both can comprise structure configured to seamlessly integrate multiple functional and aesthetic properties for the article of footwear. The structure can comprise an outer skin as described herein, an inner skin as described herein, a core structure as described herein, or a combination of any of these components. In some embodiments, the sole portion can comprise a midsole comprising interconnected unit cells as described herein.

A first embodiment (1) of the present application is directed to an article of footwear comprising a sole portion, an upper portion, an outer skin comprising a plurality of continuous beams extending adjacent to each other and defining at least part of an outer contour of the upper portion and at least part of an outer contour of the sole portion, an inner skin comprising a network of beams defining at least part of an inner contour of the upper portion, a core structure that connects the outer skin to the inner skin, the core structure comprising struts that connect beams of the outer skin to beams of the inner skin, and a midsole comprising a three-dimensional mesh comprising a plurality of interconnected unit cells, each interconnected unit cell comprising a plurality of unit cell struts defining a three-dimensional structure and a plurality of nodes at which one or more unit cell struts are connected, wherein the midsole forms part of the sole portion, and wherein the sole portion, the upper portion, the outer skin, the inner skin, the core structure, and the midsole are 3D printed as a single piece.

In a second embodiment (2), the core structure according to the first embodiment (1) is disposed around a lateral side and a medial side of the midsole and connects the midsole to the outer skin around the lateral side and the medial side of the midsole.

In a third embodiment (3), the inner skin according to the first embodiment (1) or the second embodiment (2) is disposed around a lateral side and a medial side of the midsole and connects the midsole to the core structure around the lateral side and the medial side of the midsole.

In a fourth embodiment (4), the sole portion according to any one of embodiments (1)-(3) comprises a reinforcement structure disposed within a void formed in the midsole.

In a fifth embodiment (5), the sole portion, the upper portion, the outer skin, the inner skin, the core structure, and the midsole according to any one of embodiments (1)-(4) are all formed of the same material.

In a sixth embodiment (6), a plurality of the nodes of the midsole according to any one of embodiments (1)-(5) are located an interior perimeter boundary of the midsole, and each node at the interior perimeter boundary comprises a plurality of beams of the inner skin directly connected to the node.

A seventh embodiment (7) of the present application is directed to an article of footwear comprising a sole portion, an upper portion, an outer skin comprising a plurality of continuous beams extending adjacent to each other and defining at least part of an outer contour of the upper portion and at least part of an outer contour of the sole portion, an inner skin comprising a network of beams defining at least part of an inner contour of the upper portion, and a core structure that connects beams of the outer skin to beams of the inner skin, wherein the sole portion, the upper portion, the outer skin, the inner skin, and the core structure are 3D printed as a single piece.

In an eighth embodiment (8), the core structure according to any one of embodiments (1)-(7) comprise struts that directly connect a beam of the outer skin to a beam of the inner skin.

In a ninth embodiment (9), the core structure according to any one of embodiments (1)-(8) comprises a thickness defined as the distance between the outer skin and the inner skin, and the thickness of the core structure varies across different regions of the upper portion.

In a tenth embodiment (10), the inner contour of the upper portion according to any one of embodiments (1)-(9) comprises an undulating contour that varies relative to the outer contour defined by the outer skin.

In an eleventh embodiment (11), the undulating contour according to the tenth embodiment (10) comprises a first region spaced apart from the outer skin by a first distance and a second region spaced apart from the outer skin by a second distance less than the first distance.

In a twelfth embodiment (12), a length of the struts of the core structure connecting the outer skin to the inner skin in the first region according to the eleventh embodiment (11) is greater than a length of the struts connecting the outer skin to the inner skin in the second region.

In a thirteenth embodiment (13), adjacent beams of the plurality of continuous beams of the outer skin according to any one of embodiments (1)-(12) extend substantially parallel to each other.

In a fourteenth embodiment (14), the upper portion according to any one of embodiments (1)-(13) comprises a collar defining an opening configured to receive a wearer's foot.

In a fifteenth embodiment (15), a plurality of the continuous beams of the outer skin according to the fourteenth embodiment (14) extend from the collar to the sole portion.

In a sixteenth embodiment (16), the collar according to the fourteenth embodiment (14) or the fifteenth embodiment (15) comprises a rim defining the opening for receiving a wearer's foot, and the plurality of continuous beams intersect the rim at an angle of less than 45 degrees.

In a seventeenth embodiment (17), the plurality of the beams according to the sixteenth embodiment (16) each comprise a first portion that approaches the rim at an angle ranging from greater than or equal to 45 degrees to less than or equal to 90 degrees, a turn, and a second portion extending from the turn and intersecting the rim at an angle of less than 45 degrees.

In an eighteenth embodiment (18), one of the beams of the outer skin according to any one of embodiments (1)-(17) comprises an extended portion comprising an increased height extending from the outer contour of the upper portion and defining a tab.

In a nineteenth embodiment (19), an interior surface of the inner skin according to any one of embodiments (1)-(18) comprises a release agent.

In a twentieth embodiment (20), an interior surface of the inner skin according to any one of embodiments (1)-(19) comprises a low friction texture.

In a twenty-first embodiment (21), a group of adjacent beams in the plurality of beams of the outer skin according to any one of embodiments (1)-(20) comprise beams that each have an extended portion with an increased height and define an image contour extending from the outer contour of the upper portion, the outer contour of the sole portion, or both.

In a twenty-second embodiment (22), the outer skin according to any one of embodiments (1)-(21) comprises a region where space between a group of adjacent beams is filled with a film, and wherein the film defines all or a portion of an image on the upper portion, the sole portion, or both the upper portion and the sole portion.

In a twenty-third embodiment (23), the film according to the twenty-second embodiment (22) is integrally 3D printed with the group of adjacent beams.

In a twenty-fourth embodiment (24), the sole portion according to any one of embodiments (1)-(23) comprises ground-facing surface comprising a ground-facing structure.

In a twenty-fifth embodiment (25), the ground-facing structure according to the twenty-fourth embodiment (24) comprises a cavity, and an outsole material that fills the cavity.

In a twenty-sixth embodiment (26), a plurality of the beams of the outer skin according to the twenty-fourth embodiment (24) or the twenty-fifth embodiment (25) extend from the upper portion to the ground-facing surface of the sole portion and form a portion of the ground-facing structure.

In a twenty-seventh embodiment (27), the ground-facing structure according to the twenty-sixth embodiment (26) comprises a region where space between a plurality of beams of the outer skin is filled with a film that forms recesses between adjacent beams of the plurality of beams.

In a twenty-eighth embodiment (28), the recesses according to the twenty-seventh embodiment (27) are filled with an outsole material.

In a twenty-ninth embodiment (29), the article of footwear according to any one of embodiments (1)-(28) further comprises a sock bootie coupled to the inner skin.

In a thirtieth embodiment (30), the article of footwear according to any one of embodiments (1)-(29) further comprises a plurality lace structures formed in the upper portion.

In a thirty-first embodiment (31), each of the plurality of lace structures according to the thirtieth embodiment (30) comprise an opening extending through the outer skin, the core structure, and the inner skin.

In a thirty-second embodiment (32), each of the plurality of lace structures according to the thirtieth embodiment (30) or the thirty-first embodiment (31) comprise a rim defining an aperture for receiving a lace.

In a thirty-third embodiment (33), the beams of the outer skin according to any one of embodiments (1)-(32) do not define portion of a repeating unit cell.

In a thirty-fourth embodiment (34), the outer contour defined by the beams according to any one of embodiments (1)-(33) comprises a smooth contour that does not oscillate between adjacent connection points with struts of the core structure.

In a thirty-fifth embodiment (35), a spacing distance between adjacent continuous beams according to any one of embodiments (1)-(34) varies along the outer skin.

In a thirty-sixth embodiment (36), the outer skin according to the thirty-fifth embodiment (35) comprises a portion where the spacing distance becomes zero such that adjacent beams merge together.

In a thirty-seventh embodiment (37), the network of beams defining at least a portion of an inner contour of the upper portion according to any one of embodiments (1) (36) comprise beams that intersect each other.

In a thirty-eighth embodiment (38), the plurality of beams of the outer skin according to any one of embodiments (1)-(37) define a lenticular structure at the outer contour of the upper portion and the outer contour of the sole portion.

In a thirty-ninth embodiment (39), space between adjacent beams of the outer skin and space between adjacent beams of the inner skin according to any one of embodiments (1)-(38) form through openings in the upper portion.

In a fortieth embodiment (40), the sole portion according to any one of embodiments (1)-(39) comprises a plurality of interconnected unit cells comprising a solid representation of an implicit surface.

A forty-first embodiment (41) of the present disclosure is directed to a method of making an article of footwear, the method comprising printing a green 3D-printed article, the green 3D-printed article comprising a sole portion, an upper portion, an outer skin comprising a plurality of continuous beams extending adjacent to each other and defining at least part of an outer contour of the upper portion and at least part of an outer contour of the sole portion, an inner skin comprising a network of beams defining at least part of an inner contour of the upper portion, and a core structure that connects the outer skin to the inner skin, the core structure comprising struts that connect beams of the outer skin to beams of the inner skin, and heating the green 3D-printed article to expand the 3D-printed article into the article of footwear.

In a forty-second embodiment (42), the method according to the forty-first embodiment (41) further comprises curing the article of footwear after expanding the 3D-printed article.

In a forty-third embodiment (43), the method according to the forty-second embodiment (42) further comprises inserting a jig into a foot cavity of the article of footwear before curing the article of footwear.

In a forty-fourth embodiment (44), the method according to any one of embodiments (41)-(43) further comprises inserting a reinforcement structure within one or more voids formed in the sole portion before heating the green 3D-printed article, wherein heating the green 3D-printed article expands the sole portion to secure the reinforcement structure within the sole portion.

DETAILED DESCRIPTION

Figure 1A:
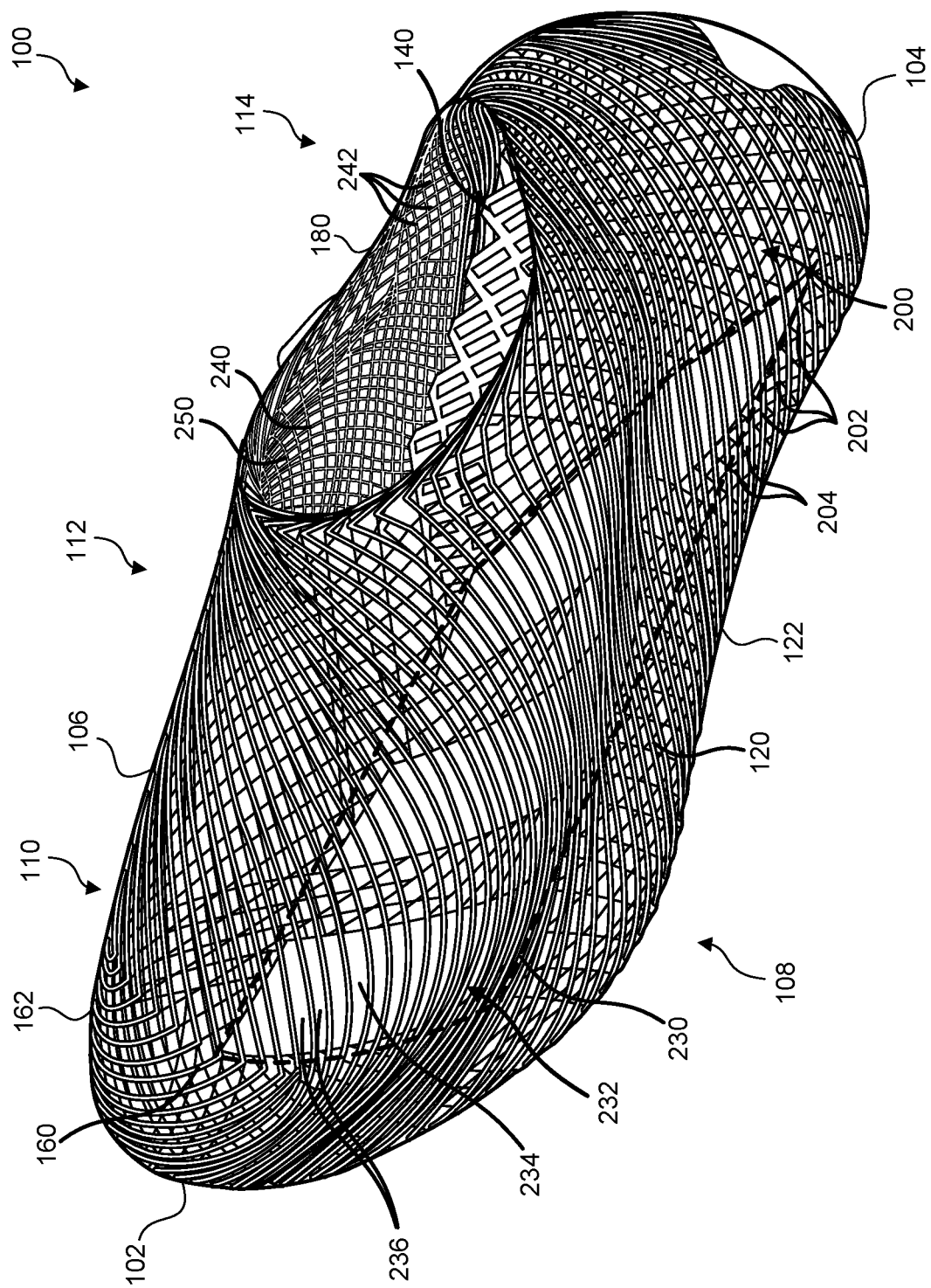
FIG. 1A shows a first perspective view of an article of footwear according to some embodiments.

The present invention(s) will now be described in detail with reference to embodiments thereof as illustrated in the accompanying drawings. References to "some embodiments", "one embodiment", "an embodiment", "an exemplary embodiment", etc., indicate that the embodiment described can comprise a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The indefinite articles "a," "an," and "the" include plural referents unless clearly contradicted or the context clearly dictates otherwise.

The term "comprising" is an open-ended transitional phrase. A list of elements following the transitional phrase "comprising" is a non-exclusive list, such that elements in addition to those specifically recited in the list can also be present.

As used herein, unless specified otherwise, references to "first," "second," "third," "fourth," etc. are not intended to denote order, or that an earlier-numbered feature is required for a later-numbered feature. Also, unless specified otherwise, the use of "first," "second," "third," "fourth," etc. does not necessarily mean that the "first," "second," "third," "fourth," etc. features have different properties or values.

Articles of footwear, and components thereof, described herein can be additively manufactured as a single piece, and in some embodiments can be additively manufactured of the same material. Footwear additively manufactured with features as described herein can be made without a traditional last and can reduce the amount of adhesive or external bonding steps required to produce an article of footwear.

Integrally forming a sole portion and an upper portion as described herein can create footwear with desired support, cushioning, and fit properties for a wearer. The integrally formed sole portion and an upper portion can provide a single overall structure designed to provide holistic properties, while features of the sole portion and an upper portion can provide specific properties for the footwear sole and upper, respectively.

Features of the footwear, for example, beams forming skins as described herein can create surfaces, or surface contours, that provide holistic structural and/or aesthetic properties while components within the skins (for example, the midsole or core structure) can provide additional properties. For example, in some embodiments, the skins can be internally formed with a midsole configured to provide desired support and ride characteristics to the sole portion. As another example, in some embodiments, the skins can be integrally formed with a core structure configured to provide desired support and fit properties to the upper portion. In such embodiments, the core structure can create zonally tuned contours that provide desired fit properties without added cushioning materials, such as foam cushioning.

Further, footwear described herein can seemly integrate various features into a single additively manufactured piece. For example, footwear described herein can seemly integrate aesthetic features, such as manufacturer banding or logos, and structural features, such as a footwear collar, footwear lacing structures, and ventilation. Features of the footwear, for example, beams forming skins as described herein, can provide these integrated features in a seamless and aesthetically appealing fashion.

FIGS. 1A-1H show an article of footwear 100 according to some embodiments. Article of footwear 100 comprises a sole portion 120 and an upper portion 160. Sole portion 120 can define all of a portion of the sole of article of footwear 100 and upper portion 160 can define all or a portion of the upper of article of footwear 100.

Article of footwear 100 can comprise a forefoot end 102, a rearfoot end 104, a medial side 106, and a lateral side 108 opposite medial side 106. Also, as shown for example in FIG. 1A, article of footwear 100 can comprise a forefoot portion 110, a midfoot portion 112, and a rearfoot portion 114. Portions 110, 112, and 114 are not intended to demarcate precise areas of article of footwear 100. Rather, portions 110, 112, and 114 are intended to represent general areas of article of footwear 100 that provide a frame of reference. Although portions 110, 112, and 114 apply generally to article of footwear 100, references to portions 110, 112, and 114 also can apply specifically to sole portion 120, upper portion 160, or individual components of sole portion 120 or upper portion 160.

Sole portion 120 can comprise a midsole 140. In such embodiments, midsole 140 forms part of sole portion 120. In some embodiments, as shown for example in FIG. 1D, midsole 140 can comprise a three-dimensional mesh 142 comprising a plurality of interconnected unit cells 144. Each interconnected unit cell 144 can comprise a plurality of unit cell struts 146 defining a three-dimensional structure and a plurality of nodes 148 at which one or more unit cell struts 146 are connected.

In some embodiments, a top surface of midsole 140 can comprise an insole skin 156. In some embodiments, insole skin 156 can comprise a network of beams 158 that intersect each other at intersection points 159, as illustrated in for example FIG. 1B. In some embodiments, intersection points 159 can be located at nodes 148 of unit cells 144 of midsole 140. In embodiments comprising skin 156, beams 158 can comprise a smooth contour that does not oscillate between adjacent intersection points 159 with struts 146 of unit cells 144. In such embodiments, beams 158 can extend continuously in a straight or curved line between intersection points 159. In some embodiments, beams 158 of skin 156 may not define a portion of a repeating unit cell 144 for midsole 140. Rather, beams 158 of skin 156 can be integrally formed on repeating unit cells 144 of midsole 140.

As used herein, the term three-dimensional mesh refers to a three-dimensional structure comprising a plurality of unit cells 144 arranged in a web-like structure or a lattice structure. The web-like or lattice structure of a three-dimensional mesh comprises interconnected structural members (for example struts 146 or ribbons) defining the plurality of unit cells 144. In embodiments comprising struts 146, the struts 146, and thus the unit cells 144, are connected at the nodes 148. For example, the struts 146 are connected at nodes 148 and define unit cells 144 arranged in a lattice configuration. In some embodiments, the plurality of interconnected unit cells 144 can be arranged in a regular or repeating lattice configuration. Exemplary lattice configurations include, but are not limited to basic cubic lattices, body-centered cubic lattices, face-centered cubic lattices, and modified lattices based on these lattice types. Exemplary lattice configurations include, but are not limited to the lattice structures described in U.S. patent application Ser. Nos. 17/069,623 and 18/313,135, which are hereby incorporated by reference in their entireties.

Unit cells 144 can have various dimensions and geometries. Further, unit cells 144 within a three-dimensional mesh can be the same or may differ. Thus, a three-dimensional mesh can include unit cells of different dimensions or geometries. The three-dimensional shape of a unit cell 144 can be defined by a plurality of interconnected struts 146 connected to one another at nodes 148. In such embodiments, each unit cell 144 can have a base geometry defined by the struts 146. As used herein, "base geometry" means the base three-dimensional shape, connection, and arrangement of the struts 146 defining a unit cell 144. The base geometry of a unit cell may be, but is not limited to, a dodecahedron (e.g., rhombic), a tetrahedron, an icosahedron, a cube, a cuboid, a prism, or a parallelepiped. Each node 148 can connect two or more struts 146.

In some embodiments, the interconnected unit cells 144 can comprise a solid representation of a repeating implicit surface of a lattice structure. In such embodiments, the unit cells can comprise a "base surface geometry" defined by the base three-dimensional shape of a body formed by one or more ribbons (walls) of material that define a solid representation of an implicit surface for a full unit cell. In some embodiments, the implicit surface can be a periodic implicit surface such that the base surface geometry of each unit cell contacts the base surface geometry of at least some adjacent unit cells to create a lattice. One example of a suitable periodic surface is a gyroid, but any type of suitable periodic surface can be used.

Herein, a solid representation of an implicit surface refers to a solid object following the shape of an implicit surface. Whereas an actual implicit surface has no thickness, a solid representation of an implicit surface has a thickness on one or both sides of the actual implicit surface in a three dimensional space. The thickness gives the solid representation volume, meaning the solid representation can be built as a physical object from physical material. The added thickness or thicknesses can be uniform, or at least approximately uniform notwithstanding fillets or local deformities, and thin in comparison to the overall size of the represented implicit surface. In some embodiments, the relative density of a unit cell of the solid representation can be from 5% to 30%, from 5% to 40%, from 10% to 25%, or from 15% to 20%. The term "relative density" as used herein refers to an amount of a unit cell occupied by solid material as a percentage of a total volume of the unit cell.

In some embodiments, the implicit surfaces can be created using a combination of random Fourier series functions, in which linear and or nonlinear coefficient as well as linear and nonlinear variables inside sinuous and cosine terms over the x, y and z space are iterated to generate the functions. The resulting unit cells can have different planes of symmetry, such as, in various examples, zero planes of symmetry, one plane of symmetry, or more than one plane of symmetry. The function can be derived in a way that satisfies the periodicity of the unit cell. Criteria for the selection of an applicable implicit surface within the design space domain can include any one or any combination of number of terms in the equation, number of connected components, the edge boundary length, surface area, and volume fraction.

In some embodiments, article of footwear 100 can comprise an outer skin 200 that defines at least part of an outer contour 162 of upper portion 160, at least part of an outer contour 122 of sole portion 120, or both at least part of an outer contour 162 of upper portion 160 and at least part of an outer contour 122 of sole portion 120. In some embodiments, outer skin 200 can comprise a plurality of continuous beams 202 extending adjacent to each other and defining at least part of outer contour 162 of upper portion 160, at least part of outer contour 122 of sole portion 120, or both. Space 204 between adjacent continuous beams 202 can separate adjacent continuous beams 202 from each other along at least a portion of sole portion 120, upper portion 160, or both. Continuous beams 202 of outer skin 200 may not define a portion of a repeating unit cell (for example, a unit cell 144 as described herein).

In some embodiments, one or more continuous beams 202 of outer skin 200 can extend from upper portion 160 to sole portion 120. In some embodiments, one or more continuous beams 202 of outer skin 200 can extend from upper portion 160 to sole portion 120 and extend across a ground-facing surface 134 of sole portion 120. In such embodiments, the one or more continuous beams 202 can form a portion of a ground-facing structure 130 for sole portion 120.

Outer contour 122 of sole portion 120 is defined by the overall outermost surface profile of the sole portion 120. Outer contour 122 is illustrated in for example FIG. 1E. Grooves or recesses between beams 202 of outer skin 200 do not define the shape of outer contour 122. Rather, outer contour 122 is characterized by the overall outmost shape of sole portion 120 defined by outer skin 200. Similarly, outer contour 162 of upper portion 160 is defined by the overall outermost surface profile of the upper portion 160. Outer contour 162 is illustrated in for example FIG. 1E. Grooves or recesses between beams 202 of outer skin 200 do not define the shape of outer contour 162. Rather, outer contour 162 is characterized by the overall outmost shape of upper portion 160 defined by outer skin 200.

In some embodiments, continuous beams 202 of outer skin 200 can extend continuously at outer contour 122, with a plurality of beams 202 extending continuously along a portion of sole portion 120. In some embodiments, continuous beams 202 of outer skin 200 can extend continuously at outer contour 162, with a plurality of beams 202 extending continuously along a portion of upper portion 160. In some embodiments, continuous beams 202 of outer skin 200 can extend continuously at outer contour 122 and outer contour 162, with a plurality of beams 202 extending continuously along a portion of sole portion 120 and a portion of upper portion 160.

Figure 1B:
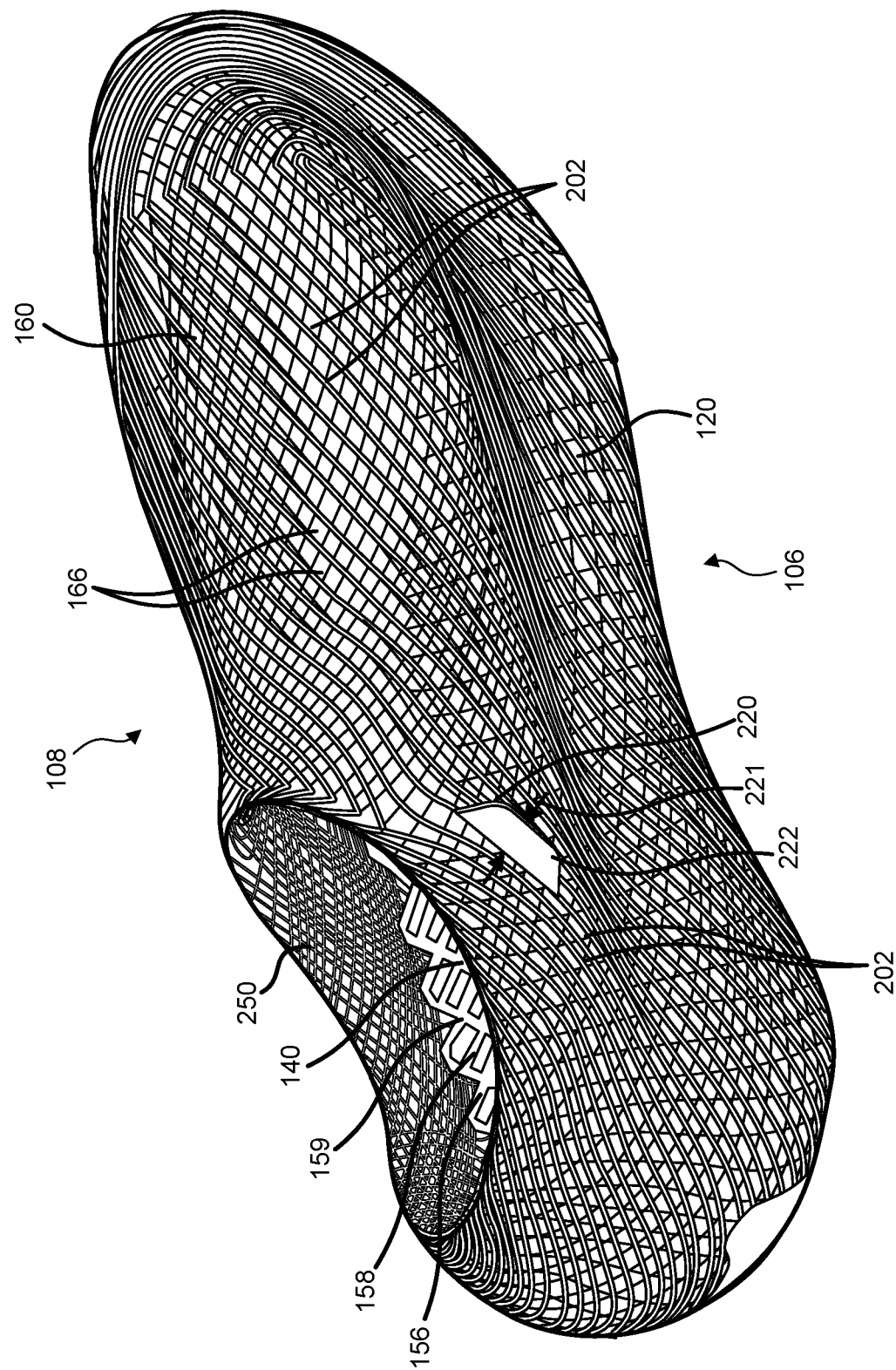
FIG. 1B shows a second perspective view of the article of footwear shown in FIG. 1A.
Figure 1C:
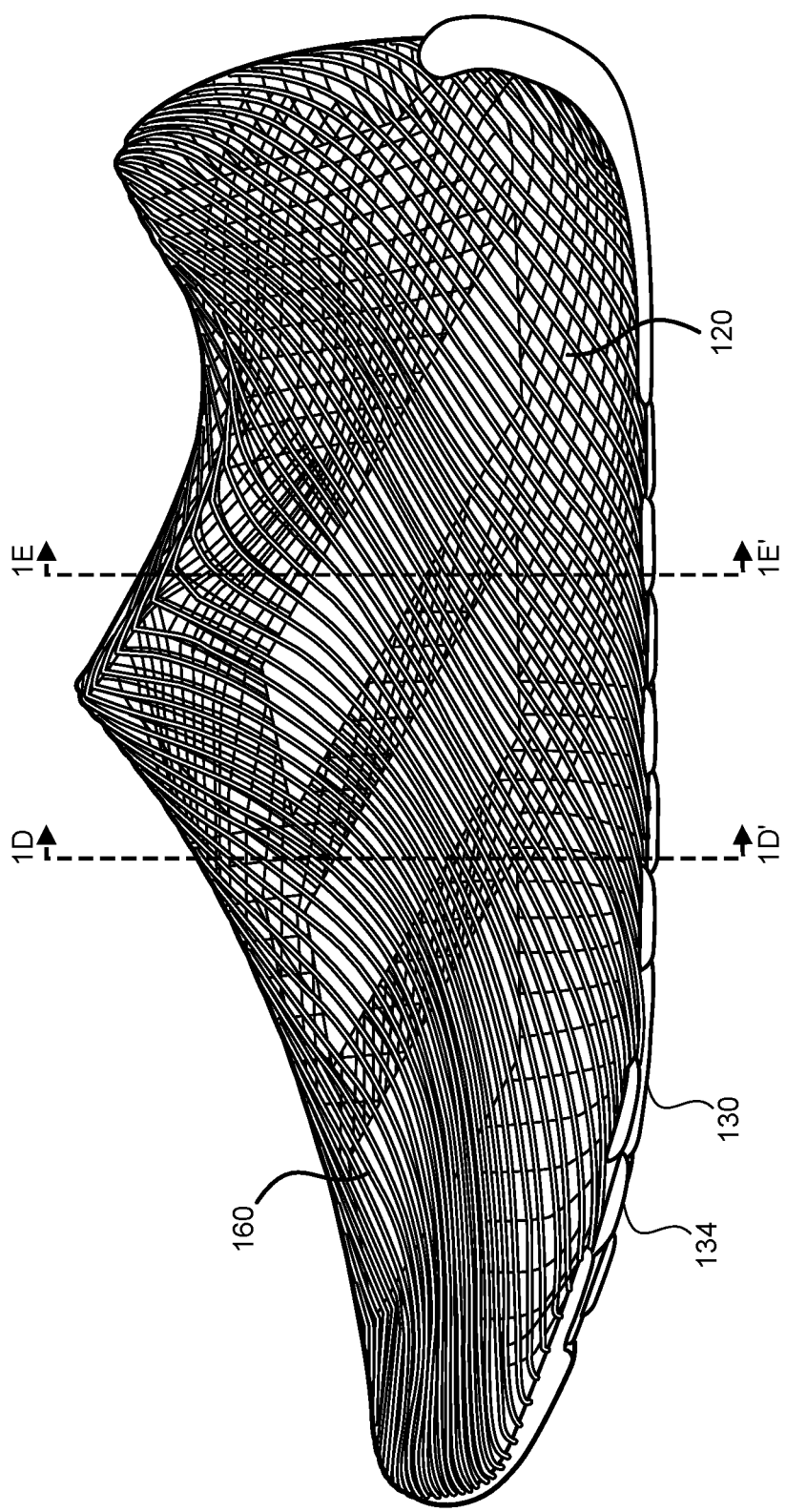
FIG. 1C shows a side view of the article of footwear shown in FIG. 1A.
Figure 1D:
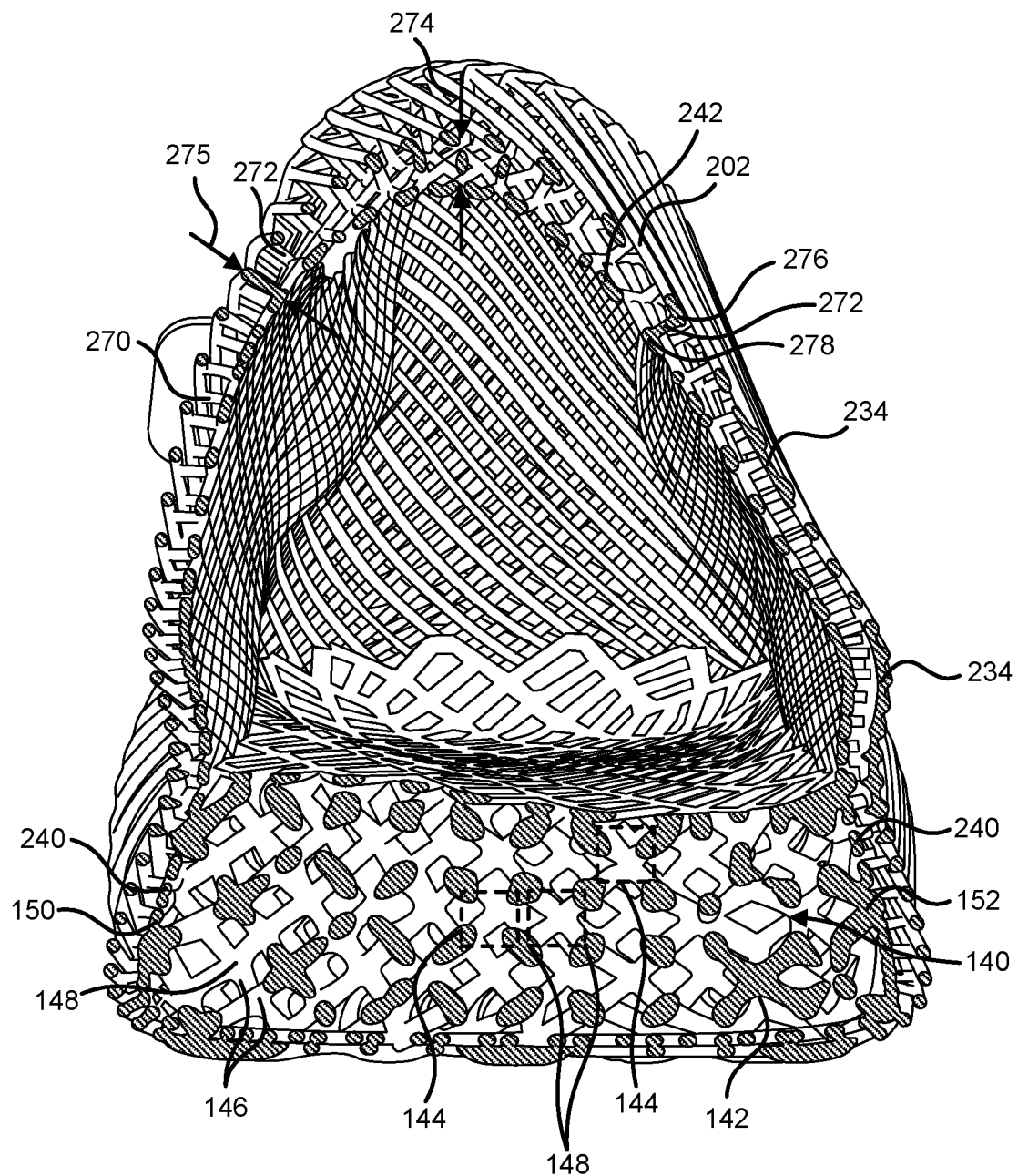
FIG. 1D shows a cross-sectional view of FIG. 1C along line 1D-1D'.

In some embodiments, one or more beams 202 can extend continuously along a distance of at least 5 centimeters. In some embodiments, one or more beams 202 can extend continuously along a distance of at least 10 centimeters. In some embodiments, one or more beams 202 can extend continuously along a distance of at least 15 centimeters. In some embodiments, one or more beams 202 can extend continuously in a straight line. In some embodiments, one or more beams 202 can extend continuously in a curved line. In some embodiments, one or more beams 202 can extend continuously and comprise a first portion 210 extending continuously in a straight or curved line before arriving at a turn 212 and a second portion 214 beginning at the turn 212 and extending continuously in a straight or curved line. In some embodiments, the turn 212 can have a turn angle ranging from greater than or equal to 10 degrees and less than or equal to 170 degrees. In some embodiments, the turn 212 can have a turn angle ranging from greater than or equal to 20 degrees and less than or equal to 160 degrees. FIG. 1H illustrates a continuous beam 202 comprising a first portion 210, a turn 212, and a second portion 214 according to some embodiments.

In some embodiments, outer contour 122 defined by continuous beams 202 can comprise a smooth contour that does not oscillate between adjacent connection points 276 with struts 272 of a core structure 270 as described herein. In such embodiments, continuous beams 202 can extend continuously in a straight or curved line between connection points 276. In some embodiments, the distance between adjacent connection points 276 on sole portion 120 can be at least 1 millimeter (mm). In some embodiments, the distance between adjacent connection points 276 can be at least 2 mm. In some embodiments, the distance between adjacent connection points 276 can be at least 5 mm.

In some embodiments, outer contour 162 defined by continuous beams 202 can comprise a smooth contour that does not oscillate between adjacent connection points 276 with struts 272 of a core structure 270 as described herein. In such embodiments, continuous beams 202 can extend continuously in a straight or curved line between connection points 276. In some embodiments, the distance between adjacent connection points 276 on upper portion 160 can be at least 1 mm. In some embodiments, the distance between adjacent connection points 276 can be at least 2 mm. In some embodiments, the distance between adjacent connection points 276 can be at least 5 mm.

In some embodiments, adjacent beams 202 of a plurality of continuous beams 202 can extend substantially parallel to each other at outer contour 122, outer contour 162, or both outer contour 122 and outer contour 162. As used herein, "substantially parallel" means that two or more beams 202 either: (i) extend along straight or curved lines that are exactly a parallel to each other for a specified length, or (ii) extend along straight or curved lines that extend +/−10 degrees relative to parallel of each other for a specified length. In some embodiments, the specified length can be at least can be at least 5 mm, at least 10 mm, or at least 15 mm.

In embodiments comprising a plurality of continuous beams 202 that extend substantially parallel to each other at outer contour 122, outer contour 162, or both, the plurality of beams 202 can define a lenticular structure at outer contour 122, outer contour 162, or both.

Adjacent continuous beams 202 extending at outer contour 122, outer contour 162, or both, can be spaced apart from each other by a spacing distance 206, as illustrated in for example FIG. 1H. In some embodiments, spacing distance 206 can range from greater than or equal to 0.1 mm to less than or equal to 10 mm.

In some embodiments, the spacing distance 206 between two adjacent beams 202 can be constant along a specified length, for example at least 5 mm, at least 10 mm, or at least 15 mm. In such embodiments, the two adjacent beams 202 can extend along straight or curved lines that are exactly a parallel to each other for the specified length.

In some embodiments, the spacing distance 206 between two adjacent beams 202 can vary along outer skin 200. In such embodiments, the two adjacent beams 202 can extend along straight or curved lines that are not exactly parallel to each other for a specified length. In some embodiments, outer skin 200 can comprise one or more portions 208 where the spacing distance 206 between two or more adjacent beams 202 is zero. In such embodiments, the two or more adjacent beams 202 can merge together at outer contour 122, outer contour 162, or both. In some embodiments, two or more adjacent beams 202 can be spaced apart as the beams 202 approach a portion 208, merge in the portion 208, and then diverge in a spaced apart relationship after portion 208. In some embodiments, a portion 208 can comprise three or more, four or more, or five or more adjacent beams 202 that merge together.

In some embodiments, article of footwear 100 can comprise an inner skin 240 defining at least part of an inner contour 164 of upper portion 160. In some embodiments, inner skin 240 can comprise beams 242 defining at least part of inner contour 164 of upper portion 160. In some embodiments, beams 242 can be the same as continuous beams 202. In such embodiments, beams 242 can comprise any feature of beams 202 as described herein. In some embodiments, inner skin 240 can comprise a network of beams 242 defining at least part of inner contour 164 of upper portion 160. In such embodiments, the network of beams 242 can comprise beams 242 that intersect each other at intersection points 244, as illustrated in for example FIG. 1G. Space 246 between adjacent beams 242 can separate adjacent beams 242 from each other along at least a portion of upper portion 160.

In embodiments comprising skin 240, beams 242 can comprise a smooth contour that does not oscillate between adjacent connection points 278 with struts 272 of a core structure 270 as described herein. In such embodiments, beams 242 can extend continuously in a straight or curved line between connection points 278. Beams 242 of inner skin 240 may not define a portion of a repeating unit cell (for example, a unit cell 144 as described herein).

In some embodiments, an interior surface 250 of inner skin 240 can comprise a low friction surface and/or a low friction texture. In such embodiments, interior surface 250 can comprise a coefficient of friction ranging from greater than or equal to 0.1 to less than or equal to 0.7. In some embodiments, the coefficient of friction can range from greater than or equal to 0.1 to less than or equal to 0.4.

In some embodiments, interior surface 250 of inner skin 240 can comprise a release agent. In such embodiments, the release agent can facilitate insertion and/or removal of a wearer's foot from article of footwear 100. Exemplary release agents include, but are not limited to, polydimethylsiloxane (PDMS), petroleum, a wax, silicone, and magnesium stearate.

In some embodiments, as illustrated in FIG. 1H, space 204 between adjacent beams 202 of outer skin 200 and space 246 between adjacent beams 242 of inner skin 240 can form through openings 166 in upper portion 160. In some embodiments, a core structure 270 as described herein may not occupy any volume within through openings 166. Through openings 166 can serve to provide ventilation for upper portion 160.

Inner contour 164 of upper portion 160 is defined by the overall innermost surface profile of the upper portion 160. Inner contour 164 is illustrated in for example FIG. 1E. Grooves or recesses between beams 242 of inner skin 240 do not define the shape of inner contour 164. Rather, inner contour 164 is characterized by the overall innermost shape of upper portion 160 defined by inner skin 240.

Figure 1E:
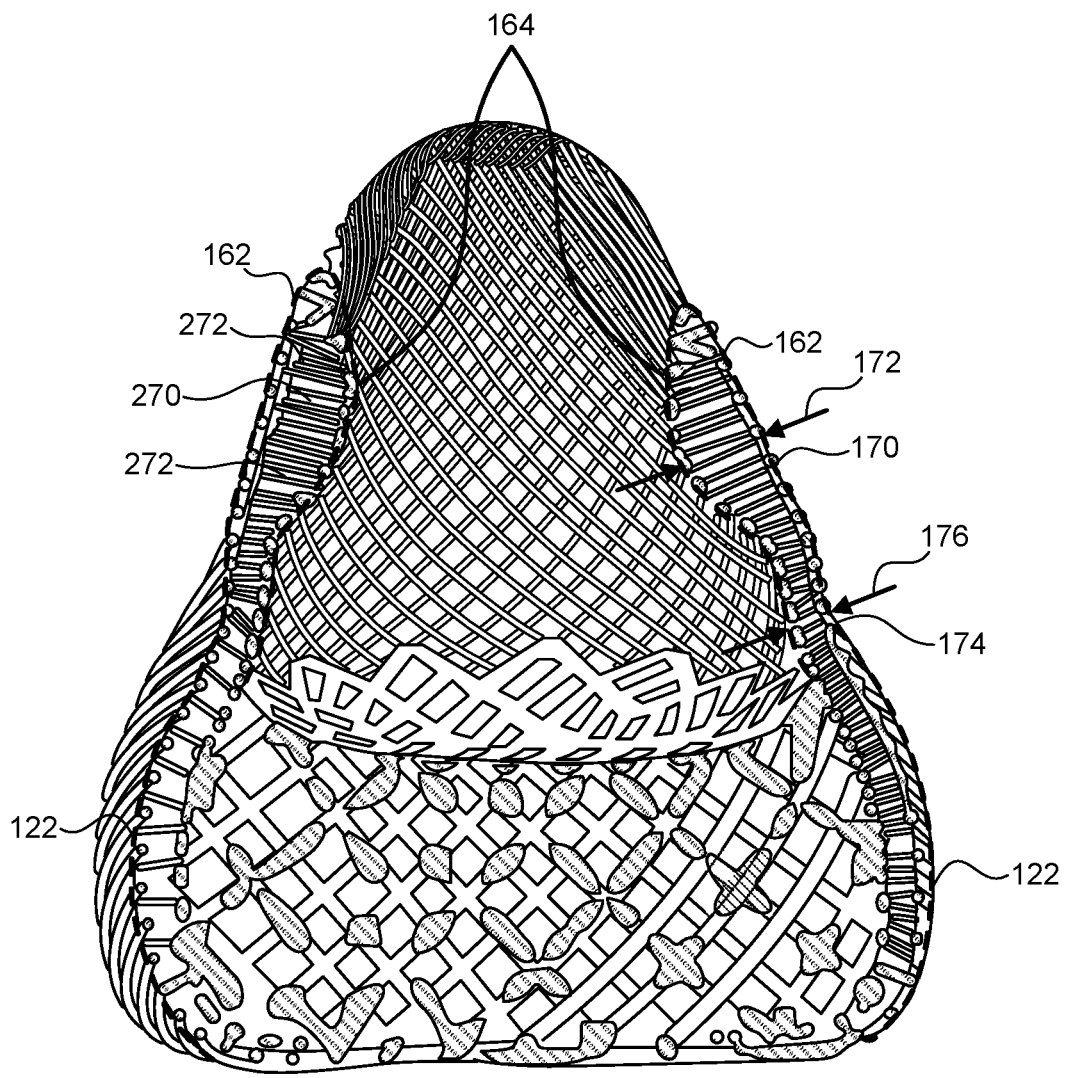
FIG. 1E shows a cross-sectional view of FIG. 1C along line 1E-1E'.
Figure 1F:
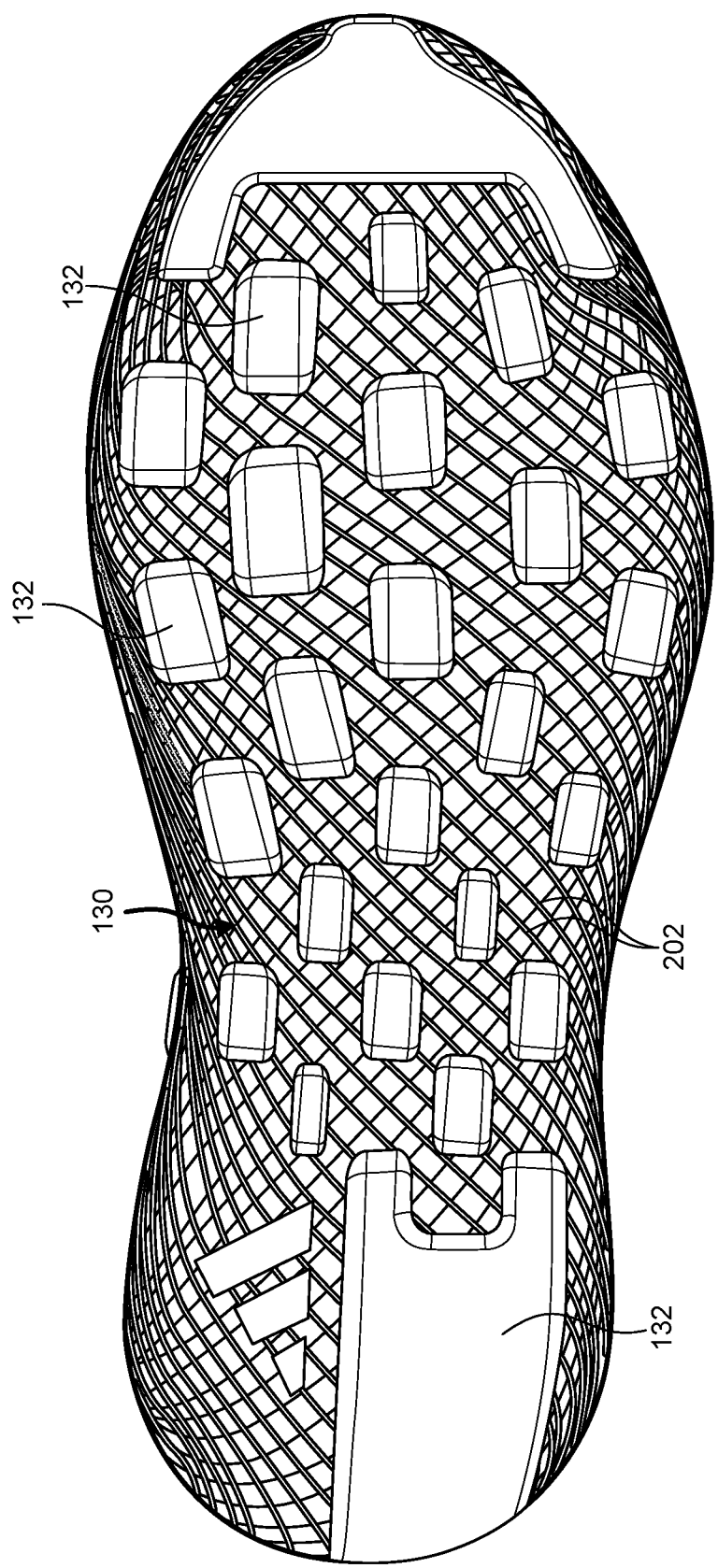
FIG. 1F shows a bottom view of the article of footwear shown in FIG. 1A.

In some embodiments, as illustrated in for example FIG. 1E, inner contour 164 of upper portion 160 can comprise an undulating contour that varies relative to outer contour 122 defined by outer skin 200. In such embodiments, the undulating inner contour 164 can comprise a first region 170 spaced apart from outer skin 200 by a first distance 172 and a second region 174 spaced apart from outer skin 200 by a second distance 176 less than the first distance 172. In such embodiments, a length 275 of the struts 272 of a core structure 270 connecting outer skin 200 to inner skin 240 in the first region 170 can be greater than a length 275 of struts 272 connecting outer skin 200 to inner skin 240 in second region 174.

In some embodiments, first distance 172 and second distance 176 can range from greater than or equal to 0.2 mm to less than or equal to 30 mm, including subranges. For example, distance 172 and distance 176 can range from greater than or equal to 0.2 mm to less than or equal to 26 mm, from greater than or equal to 0.2 mm to less than or equal to 22 mm, from greater than or equal to 0.2 mm to less than or equal to 18 mm, from greater than or equal to 0.4 mm to less than or equal to 30 mm, from greater than or equal to 1 mm to less than or equal to 30 mm, or from greater than or equal to 2 mm to less than or equal to 30 mm. In some embodiments, distance 172 and distance 176 can range from greater than or equal to 0.4 mm to less than or equal to 26 mm.

In some embodiments, the second distance 176 can be at least 4 mm less than the first distance 172. As another example, in some embodiments, second distance 176 can be at least 10 mm less than the first distance 172.

Distances 172 and 176 can be varied to provide a targeted amount of cushioning and/or fit to different regions of upper portion 160. In addition, distances 172 and 176 can be varied based on the contour of a wearer's foot.

In some embodiments, as shown for example in FIG. 1D, inner skin 240 can be disposed around a lateral side 152 of midsole 140. In some embodiments, inner skin 240 can be disposed around a medial side 150 of midsole 140. In some embodiments, inner skin 240 can be disposed around lateral side 152 and medial side 150 of midsole 140. In such embodiments, inner skin 240 can connect midsole 140 to struts 272 of a core structure 270 around all or a portion of lateral side 152 and/or all or a portion of medial side 150 of midsole 140. In some embodiments, inner skin 240 can directly connect midsole 140 to struts 272 of core structure 270 around all or a portion of lateral side 152 and/or all or a portion of medial side 150 of midsole 140. In some embodiments, inner skin 240 can directly connect nodes 148 of unit cells 144 to struts 272 of core structure 270 around all or a portion of lateral side 152 and/or all or a portion of medial side 150 of midsole 140.

Figure 1G:
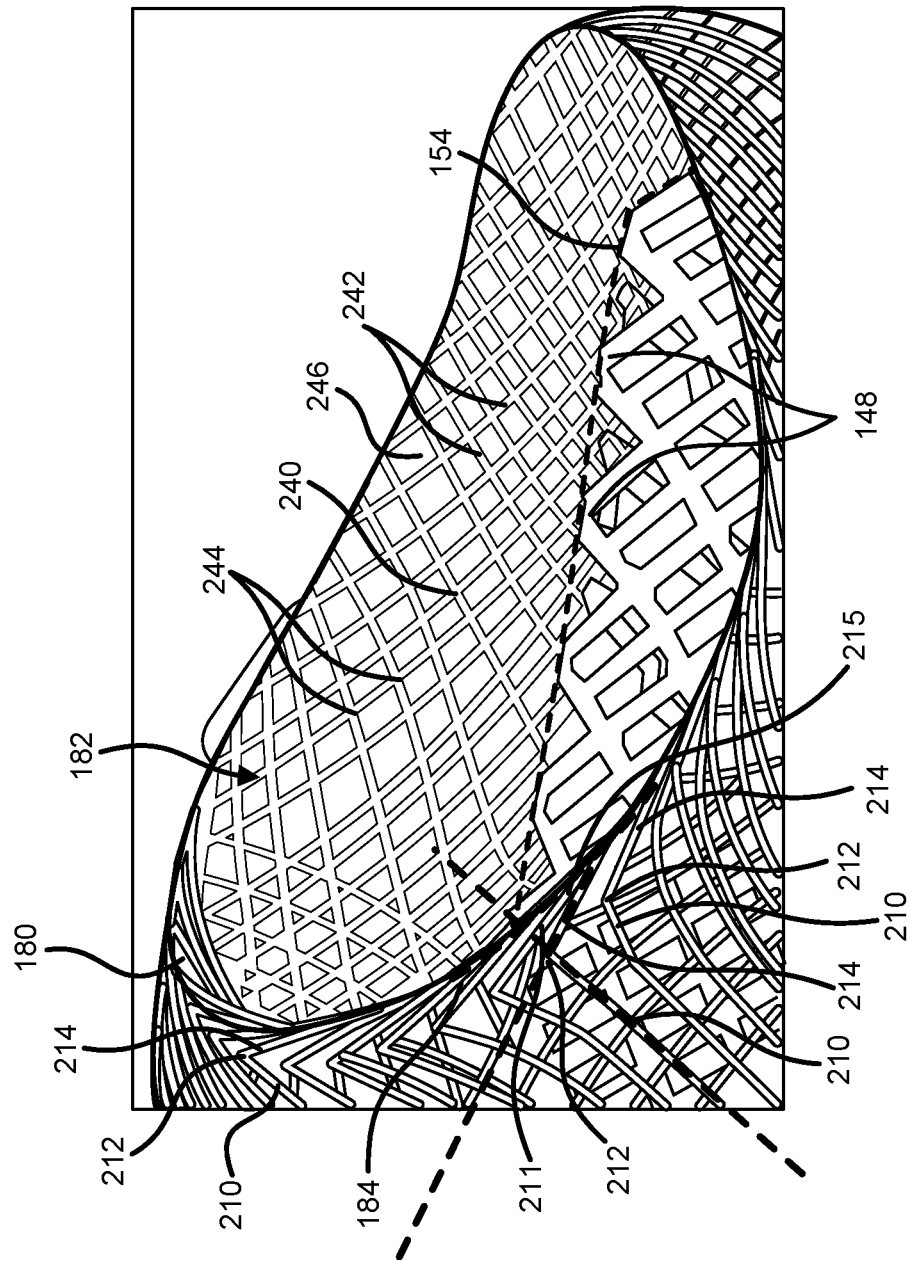
FIG. 1G shows an enlarged portion of FIG. 1A.
Figure 1H:
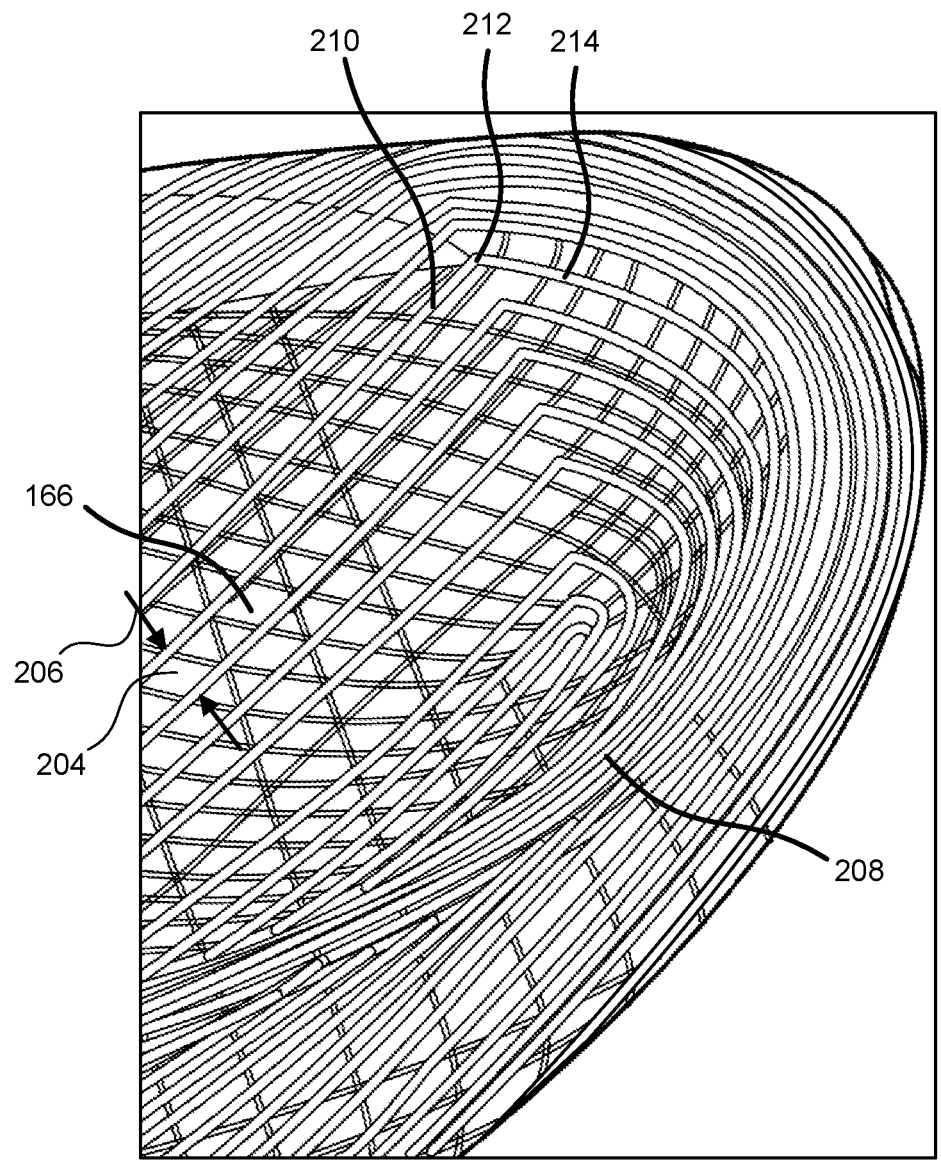
FIG. 1H shows an enlarged portion of FIG. 1B.

In some embodiments, as illustrated in for example FIG. 1G, a plurality of the nodes 148 of midsole 140 can be located at an interior perimeter boundary 154 of midsole 140. In some embodiments, each of the plurality of nodes 148 at interior perimeter boundary 154 can comprise a plurality of beams 242 of inner skin 240 directly connected to the node 148. In some embodiments, intersection points 159 of insole skin 156 can be located at nodes 148 of midsole 140 at interior perimeter boundary 154.

As illustrated in for example FIGS. 1D and 1E, article of footwear 100 can comprise a core structure 270 that connects outer skin 200 to inner skin 240. Core structure 270 can comprise struts 272 that connect beams 202 of outer skin 200 to beams 242 of inner skin 240. In some embodiments, core structure 270 can comprise struts 272 that directly connect a beam 202 of outer skin 200 to a beam 242 of inner skin 240. In such embodiments, a first end of a strut 272 can connect to a beam 202 at a connection point 276 and a second end of the strut 272 can connect to a beam 242 at a connection point 278. In some embodiments, upper portion 160 can include one or more regions with core structure 270 and one or more regions without core structure 270. In regions without core structure 270, beams 202 of outer skin 200 can be directly connected to beams 242 of inner skin 240.

In some embodiments, struts 272 of core structure 270 can be linear struts that directly connect a beam 202 of outer skin 200 to a beam 242 of inner skin 240. In such embodiments, the linear struts can extend directly from a beam 202 of outer skin 200 to a beam 242 of inner skin 240 with changing direction at a node or turn. In some embodiments, struts 272 of core structure 270 can define unit cells (for example, unit cells 144) that connect beams 202 of outer skin 200 to beams 242 of inner skin 240. In such embodiments, the unit cells can comprise a plurality of struts (e.g., struts 146) that form a connection between a beam 202 of outer skin 200 and a beam 242 of inner skin 240.

In some embodiments, core structure 270 can be disposed around a lateral side 152 of midsole 140. In some embodiments, core structure 270 can be disposed around a medial side 150 of midsole 140. In some embodiments, core structure 270 can be disposed around lateral side 152 and medial side 150 of midsole 140. In such embodiments, core structure 270 can connect midsole 140 to outer skin 200 around all or a portion of lateral side 152 and/or all or a portion of medial side 150 of midsole 140. In such embodiments, struts 272 of core structure 270 can connect beams 202 of outer skin 200 to unit cells 144 of midsole 140. In some embodiments, core structure 270 can comprise struts 272 that directly connect a beam 202 of outer skin 200 to a node 148 or strut 146 of a unit cell 144. In some embodiments, struts 272 of core structure 270 can be linear struts that directly connect a beam 202 of outer skin 200 to a node 148 or strut 146 of a unit cell 144. In such embodiments, the linear struts can extend directly from a beam 202 of outer skin 200 to a node 148 or strut 146 of a unit cell 144 with changing direction at a node or turn.

In some embodiments, a thickness 274 of core structure 270 can vary across different regions of upper portion 160. In such embodiments, as illustrated in FIG. 1D, thickness 274 is defined as the distance between outer skin 200 and inner skin 240. In embodiments comprising a core structure 270 with linear struts 272, thickness 274 can be the length 275 of the linear struts 272 directly connecting a beam 202 of outer skin 200 to a beam 242 of inner skin 240.

In some embodiments, thickness 274 can range from greater than or equal to 0.2 mm to less than or equal to 30 mm, including subranges. For example, thickness 274 can range from greater than or equal to 0.2 mm to less than or equal to 26 mm, from greater than or equal to 0.2 mm to less than or equal to 22 mm, from greater than or equal to 0.2 mm to less than or equal to 18 mm, from greater than or equal to 0.4 mm to less than or equal to 30 mm, from greater than or equal to 1 mm to less than or equal to 30 mm, or from greater than or equal to 2 mm to less than or equal to 30 mm. In some embodiments, thickness 274 can range from greater than or equal to 0.4 mm to less than or equal to 26 mm.

In some embodiments, in a first region 170 of upper portion 160, core structure 270 can comprise a first thickness 274 and, in a second region 174 of upper portion 160, core structure 270 can comprise a second thickness 274 less than the first thickness 274. For example, in some embodiments, the second thickness 274 can be at least 4 mm less than the first thickness 274. As another example, in some embodiments, the second thickness 274 can be at least 10 mm less than the first thickness 274.

Thickness 274 of core structure 270 can be varied to provide targeted amount of cushioning and/or fit to different regions of upper portion 160. In addition, thickness 274 of core structure 270 can be varied based on the contour of a wearer's foot.

As discussed herein, sole portion 120 and upper portion 160 can be additively manufactured (3D printed) as a single piece. Further, various components of footwear 100 can be additively manufactured (3D printed) as a single piece. Any two or more components of footwear 100 can be 3D printed as a single piece. For example, in embodiments comprising outer skin 200, inner skin 240, core structure 270, and midsole 140, each of sole portion 120, upper portion 160, outer skin 200, inner skin 240, core structure 270, and midsole 140 can be 3D printed as a single piece. As another example, in embodiments comprising outer skin 200, inner skin 240, and core structure 270, each of sole portion 120, upper portion 160, outer skin 200, inner skin 240, and core structure 270 can be 3D printed as a single piece. As another example, outer skin 200, inner skin 240, and core structure 270 can be 3D printed as a single piece.

In some embodiments, sole portion 120 and upper portion 160 can be formed of the same material. Further, various components of footwear 100 can be formed of the same material. Any two or more components of footwear 100 can formed of the same material. For example, in embodiments comprising outer skin 200, inner skin 240, core structure 270, and midsole 140, each of sole portion 120, upper portion 160, outer skin 200, inner skin 240, core structure 270, and midsole 140 can formed of the same material. As another example, in embodiments comprising outer skin 200, inner skin 240, and core structure 270, each of sole portion 120, upper portion 160, outer skin 200, inner skin 240, and core structure 270 can be formed of the same material. As another example, outer skin 200, inner skin 240, and core structure 270 can be formed of the same material.

Exemplary materials for sole portion 120 and upper portion 160, and any other component of footwear 100 include, but at not limited to, a foam, a rubber, ethyl vinyl acetate (EVA), a thermoplastic elastomer, a polyurethane, a thermoplastic polyurethane (TPU), an elastomeric polyurethane, an expanded thermoplastic polyurethane (eTPU), an expanded elastomeric polyurethane, a polyether block amide (PEBA), an expanded polyether block amide (ePEBA), a thermoplastic rubber (TPR), and a polyolefin, for example polyethylene (PE), polystyrene (PS), or polypropylene (PP), polyamides (nylon), or a combination of any of these materials, or a foam comprising one or more of these materials. Additional materials for use in forming sole portion 120 and upper portion 160 include carbon and carbon allotropes, such as graphene, carbon nanotubes, and carbon fibers, fiber reinforced polymers, biological materials such as Mycelium, and metals, such as aluminum, steel, or titanium, among others and combinations thereof.

An articles of footwear described herein (for example, article of footwear 100), and any component of footwear described herein (for example, sole portion 120 or upper portion 160), can be formed by additive manufacturing (e.g., three-dimensional (3D) printing). Exemplary additive manufacturing techniques include for example, selective laser sintering, selective laser melting, selective heat sintering, stereo lithography, fused deposition modeling, or 3-D printing in general. Various additive manufacturing techniques related to articles of footwear are described for example in US 2009/0126225, WO 2010/126708, US 2014/0300676, US 2014/0300675, US 2014/0299009, US 2014/0026773, US 2014/0029030, WO 2014/008331, WO 2014/015037, US 2014/0020191, EP 2564719, EP 2424398, and US 2012/0117825. In some embodiments, the additive manufacturing process can include a continuous liquid interface production process. For example, the additive manufacturing process can include a continuous liquid interface production process as described in U.S. Pat. No. 9,453,142, issued on Sep. 27, 2016, which is hereby incorporated in its entirety by reference thereto.

In some embodiments, 3-D printing an article of footwear, or component thereof, can comprise 3-D printing the article or component in an intermediate green state, shaping the article or component in the green state, and curing the green state in its final shape. In some embodiments, 3-D printing an article of footwear, or component thereof, can comprise 3-D printing the article or component in an intermediate green state, expanding the intermediate green state, shaping the article or component in the green state, and curing the green state in its final shape.

Techniques for producing an intermediate green state object from resins by additive manufacturing are known. Suitable techniques include bottom-up and top-down additive manufacturing, generally known as stereolithography. Such methods are known and described in, for example, U.S. Pat. No. 5,236,637 to Hull, U.S. Pat. Nos. 5,391,072 and 5,529,473 to Lawton, U.S. Pat. No. 7,438,846 to John, U.S. Pat. No. 7,892,474 to Shkolnik, U.S. Pat. No. 8,110,135 to El-Siblani, U.S. Patent Application Publication No. 2013/0292862 to Joyce, and US Patent Application Publication No. 2013/0295212 to Chen et al. The disclosures of these patents and applications are incorporated by reference herein in their entirety.

In some embodiments, the additive manufacturing step can be carried out by one of the family of methods sometimes referred to as continuous liquid interface production (CLIP). CLIP is known and described in, for example, U.S. Pat. Nos. 9,211,678; 9,205,601; 9,216,546; and others; in J. Tumbleston et al., Continuous liquid interface production of 3D Objects, Science 347, 1349-1352 (2015); and in R. Janusziewcz et al., Layerless fabrication with continuous liquid interface production, *Proc. Natl. Acad. Sci. USA* 113, 11703-11708 (Oct. 18, 2016). Other examples of methods and apparatus for carrying out particular embodiments of CLIP include, but are not limited to: Batchelder et al., US Patent Application Pub. No. US 2017/0129169 (May 11, 2017); Sun and Lichkus, US Patent Application Pub. No. US 2016/0288376 (Oct. 6, 2016); Willis et al., US Patent Application Pub. No. US 2015/0360419 (Dec. 17, 2015); Lin et al., US Patent Application Pub. No. US 2015/0331402 (Nov. 19, 2015); D. Castanon, US Patent Application Pub. No. US 2017/0129167 (May 11, 2017). B. Feller, US Pat App. Pub. No. US 2018/0243976 (published Aug. 30, 2018); M. Panzer and J. Tumbleston, US Pat App Pub. No. US 2018/0126630 (published May 10, 2018); K. Willis and B. Adzima, US Pat App Pub. No. US 2018/0290374 (Oct. 11, 2018) L. Robeson et al., PCT Patent Pub. No. WO 2015/164234 (see also U.S. Pat. Nos. 10,259,171 and 10,434,706); and C. Mirkin et al., PCT Patent Pub. No. WO 2017/210298 (see also US Pat. App. US 2019/0160733). The disclosures of these patents and applications are incorporated by reference herein in their entirety.

While stereolithography techniques such as CLIP can be preferred, it will be appreciated that other additive manufacturing techniques, such as jet printing (see, e.g., U.S. Pat. No. 6,259,962 to Gothait and US Patent App. Serial No. US 2020/0156308 to Ramos et al.) can also be used.

In some embodiments, upper portion 160 can comprises a collar 180 defining an opening 182 configured to receive a wearer's foot. In some embodiments, collar 180 can comprise a rim 184 defining opening 182. In some embodiments, one or more continuous beams 202 of outer skin 200 can extend from collar 180 (for example, from rim 184 of collar). In some embodiments, one or more continuous beams 202 of outer skin 200 can extend from collar 180 to sole portion 120. In some embodiments, one or more continuous beams 202 of outer skin 200 can extend from collar 180 to a ground-facing surface 134 of sole portion 120.

In some embodiments, as illustrated in for example FIG. 1G, a plurality of continuous beams 202 of outer skin 200 can intersect rim 184 at an angle 215 of less than 45 degrees. In some embodiments, a plurality of continuous beams 202 of outer skin 200 can intersect rim 184 at an angle 215 of less than 30 degrees.

In some embodiments, the plurality of continuous beams 202 that intersect rim 184 at an angle 215 of less than 45 degrees can each comprise a first portion 210 that approaches the rim 184 at an angle 211 ranging from greater than or equal to 45 degrees and less than or equal to 90 degrees, a turn 212, and a second portion 214 extending from the turn 212 and intersecting the rim 184 at an angle of less than 45 degrees. In some embodiments, the plurality of continuous beams 202 that intersect rim 184 at an angle 215 of less than 30 degrees can each comprise a first portion 210 that approaches the rim 184 at an angle 211 ranging from greater than or equal to 30 degrees and less than or equal to 90 degrees, a turn 212, and a second portion 214 extending from the turn 212 and intersecting the rim 184 at an angle of less than 30 degrees.

In some embodiments, by intersecting rim 184 at an angle of less than 45 degrees, or at an angle of less than 30 degrees, undesirably high stress concentrations at connection points between beams 202 and rim 184 during use can be limited or avoided.

Figure 12:
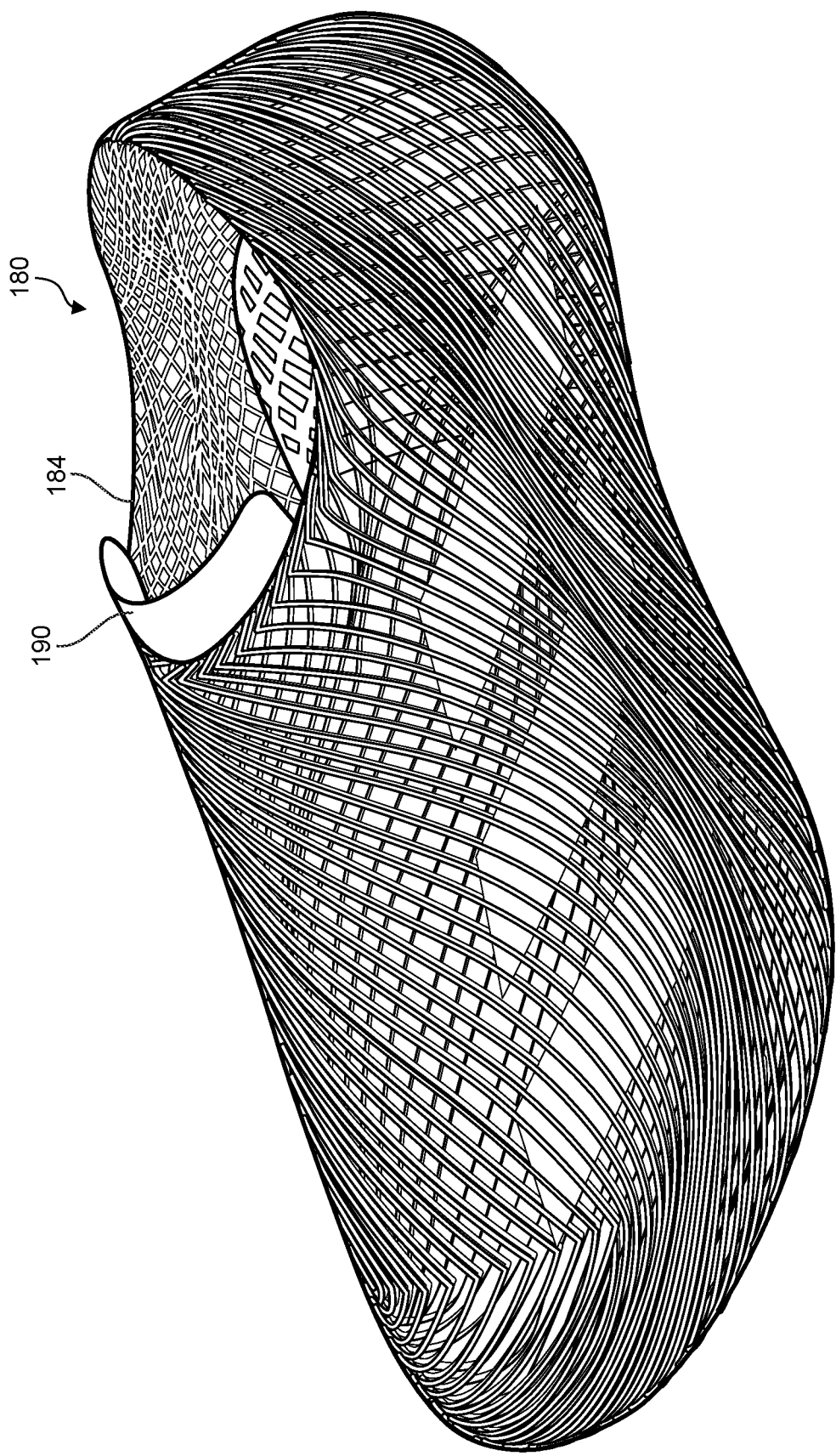
FIG. 12 shows an article of footwear according to some embodiments.

In some embodiments, as shown for example in FIG. 12, collar 180 can comprise a pull tab 190 extending into opening 182. In such embodiments, pull tab 190 can form all or a portion of a tongue for article of footwear 100. In some embodiments, pull tab 190 can be integrally formed with (for example, integrally 3D printed with) upper portion 160. In some embodiments, pull tab 190 can be integrally formed with (for example, integrally 3D printed with) inner skin 240 of upper portion 160. In some embodiments, pull tab 190 can extend from rim 184 of collar 180.

Figure 13:
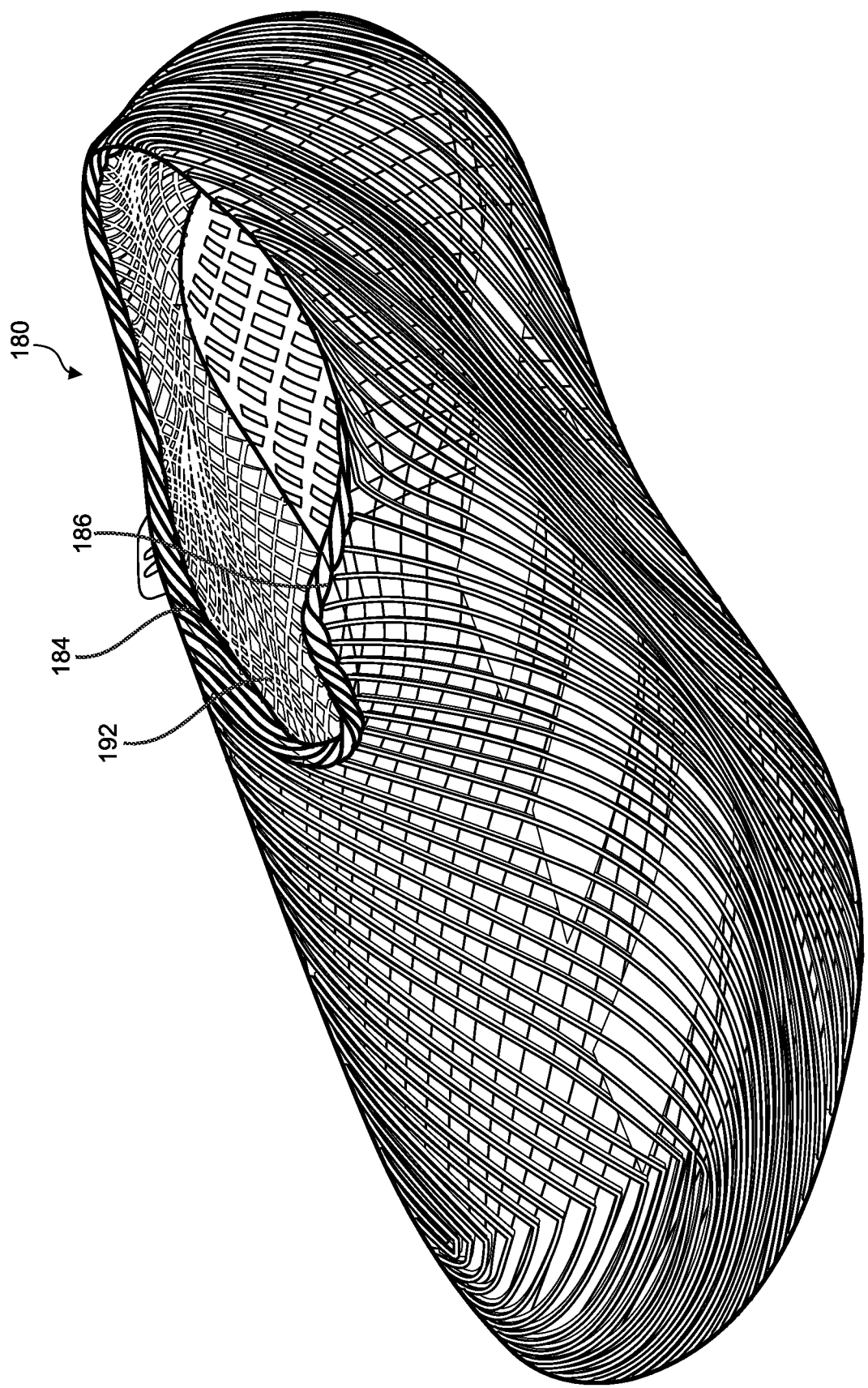
FIG. 13 shows an article of footwear according to some embodiments.

In some embodiments, as shown for example in FIG. 13, collar 180 can comprise a notch 192 extending forward from opening 182 towards forefoot end 102 of article of footwear. In such embodiments, notch 192 can form all or a portion of a throat for article of footwear 100. In some embodiments, rim 184 of collar 180 can extend around notch 192.

In some embodiments, as shown for example in FIG. 13, collar 180 can comprise a perimeter beam 186 spaced apart from and extending around all or a portion of rim 184. In such embodiments, perimeter beam 186 can be can be integrally formed with (for example, integrally 3D printed with) upper portion 160. In some embodiments, perimeter beam 186 can be integrally formed with (for example, integrally 3D printed with) outer skin 200 of upper portion 160. Perimeter beam 186 can intersect a plurality of continuous beams 202 of outer skin 200 around all or a portion of a perimeter of rim 184. In some embodiments, perimeter beam 186 can intersect a plurality of continuous beams 202 of outer skin 200 at turns 212 around all or a portion of a perimeter of rim 184. In some embodiments, perimeter beam 186 can extend around at least the portion of rim 184 around notch 192.

Figure 14:
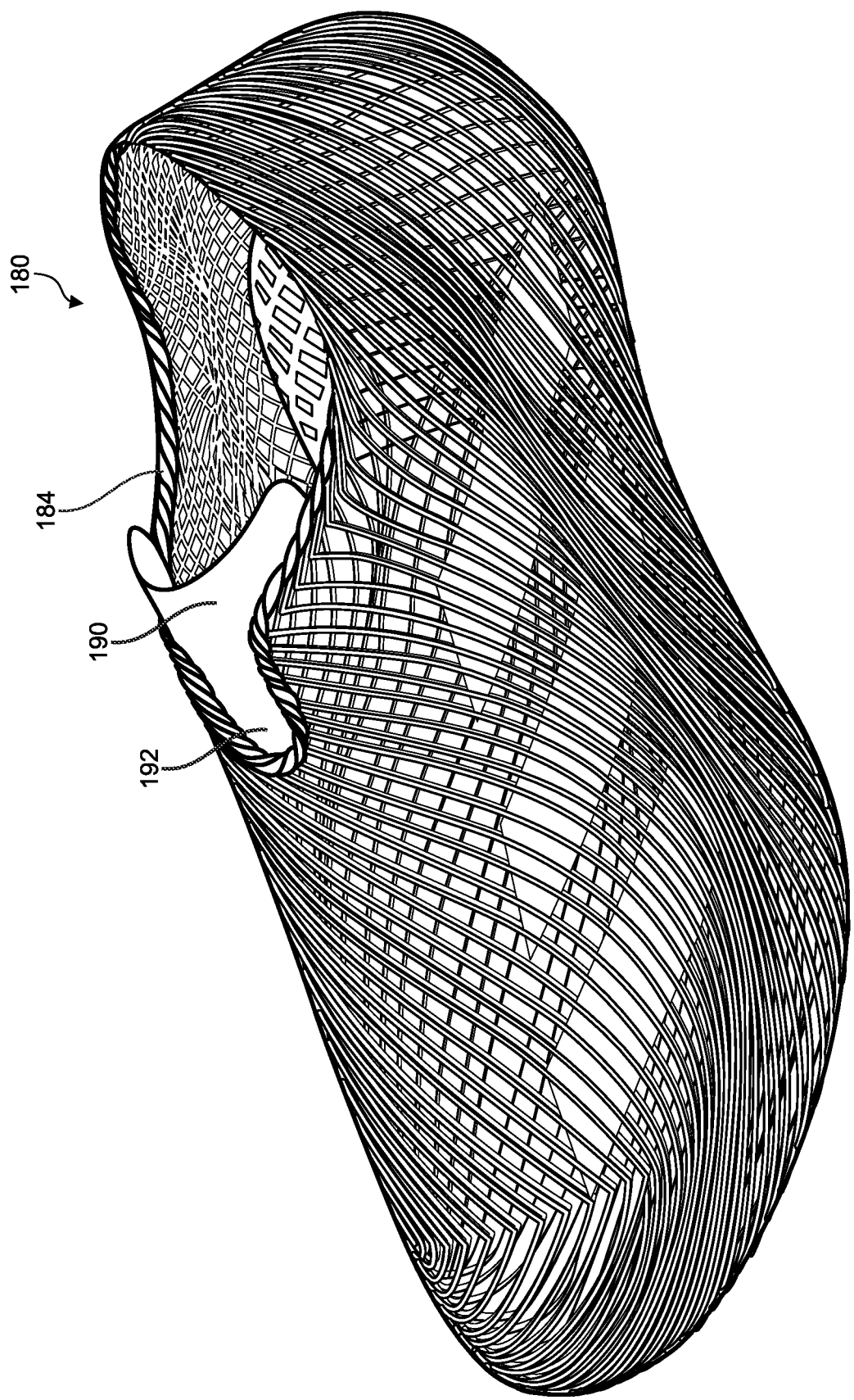
FIG. 14 shows an article of footwear according to some embodiments.

In some embodiments, as shown for example in FIG. 14, collar 180 can comprise pull tab 190 and notch 192. In such embodiments, pull tab 190 can be disposed within notch 192.

In some embodiments, one or more continuous beams 202 of outer skin 200 can comprise an extended portion 220 comprising an increased height 221 extending from outer contour 122 of sole portion 120, outer counter 162 of the upper portion 160, or both. In some embodiments, extended portion 220 of a continuous beam 202 can define a tab 222 on upper portion 160. FIG. 1B illustrates a tab 222 on upper portion 160 according to some embodiments. In some embodiments, extended portion 220 of a continuous beam 202 can define a tab 222 on sole portion 120.

As shown for example, in FIG. 1A, in some embodiments, outer skin 200 can comprise a region 230 with one or more images 232. Image(s) 232 can comprise, but are not limited to a manufacture's logo, a trademark, a technology name, numerical images, non-numerical images, user customized images, and other graphical images.

Exemplary graphical image types for image(s) 232 can comprise a basic geometrical shape, an animal character shape, a sports object shape, or a symbol. Exemplary basic geometrical shapes for image(s) 232 comprise a triangle, a quadrilateral, a polygon (e.g., a pentagon, a hexagon, a heptagon, etc.), a circle, an ellipse, a crescent, and a pill-shape. Exemplary animal character shapes for image(s) 232 comprise a bear, a bison, a cat, a dog (for example, a husky), a tiger, a lion, a horse, an elephant, a giraffe, a monkey, a gorilla, a bird, a ram, a turtle, a snake, a spider, a fish, or a shark. Exemplary sports object shapes for the images comprise a soccer ball, a baseball, a softball, a basketball, a tennis ball, a volleyball, a frisbee, a football, a golf club, a lacrosse stick, a hockey stick, a hockey skate, a baseball cap, a baseball bat, a skateboard, and a surf board. Exemplary symbols for image(s) 232 comprise a dollar sign, a Greek letter, a peace sign, a ying-yang, a zodiac sign, a heart, a spade, and a musical note.

In some embodiments, region 230 can comprise one or more films 234 that fill in space 204 between one or more groups of adjacent continuous beams 202. In such embodiments, film(s) 234 can define all or a portion of an image 232 on upper portion 160, sole portion 120, or both. In some embodiments, film(s) 234 can comprise a thickness less than the thickness of beams 202 to create cavities 236 between adjacent beams 202. Together, beams 202 and film(s) 234 can define one or more images 232 on outer skin 200, and therefore on footwear 100. In some embodiments, film(s) 234 can be integrally 3D printed with the group of adjacent continuous beams 202 within region 230.

In some embodiments, region 230 can comprise one or more films 234 that fill in space 246 between one or more groups of adjacent beams 242 of inner skin 240. In such embodiments, film(s) 234 can define all or a portion of an image 232 on upper portion 160, sole portion 120, or both. Together, beams 242 and film(s) 234 can define one or more images 232 on inner skin 240, and therefore on footwear 100. In some embodiments, film(s) 234 can be integrally 3D printed with the group of adjacent beams 242 within region 230.

Figure 2:
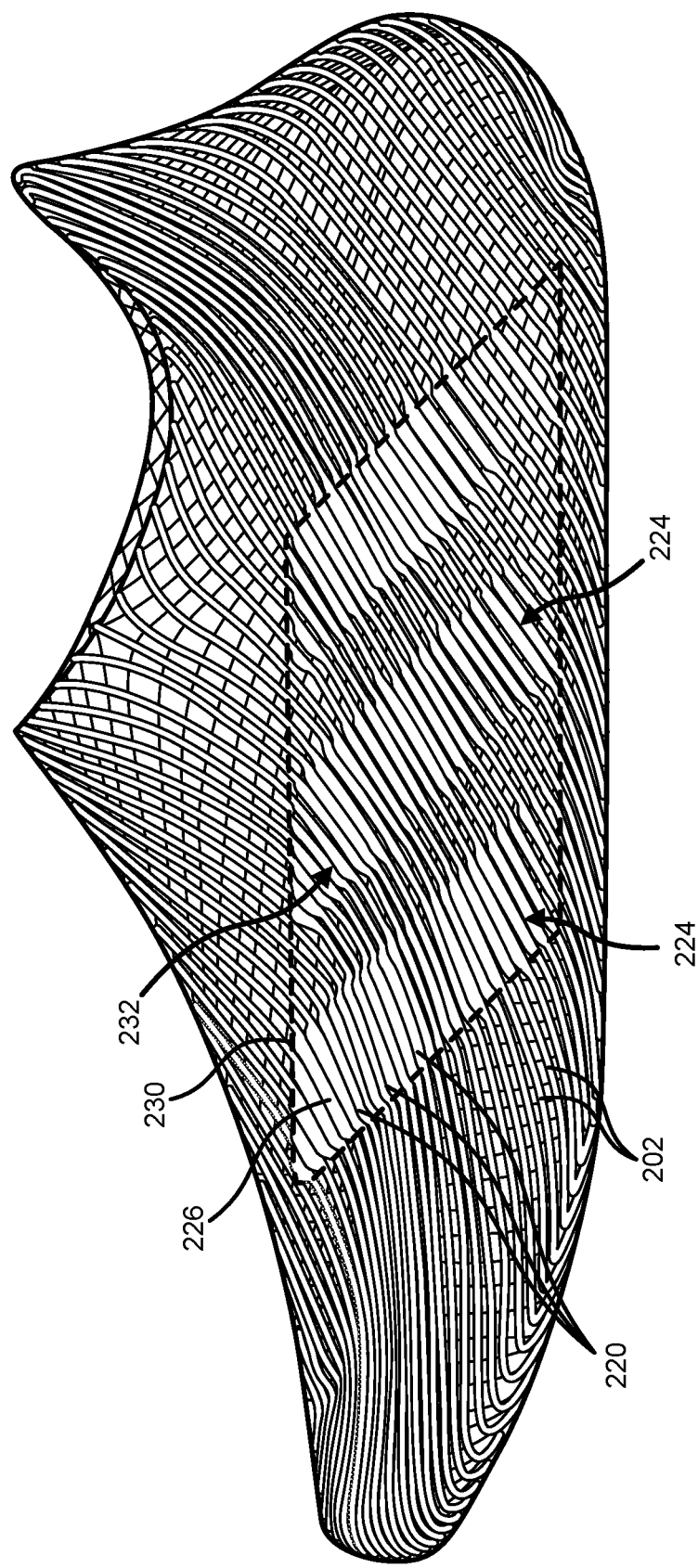
FIG. 2 shows an article of footwear comprising a region with an image contour according to some embodiments.

In some embodiments, as illustrated in for example FIG. 2, region 230 can comprise one or more images 232 defined by an image contour 226 extending from outer contour 122, outer contour 162, or both. In such embodiments, one or more groups 224 of adjacent beams 202 of outer skin 200 can comprise beams 202 that each have an extended portion 220 with an increased height 221 and define an image contour 226 extending from outer contour 122, outer contour 162, or both.

In some embodiments, sole portion 120 can comprise a ground-facing surface 134 comprising a ground-facing structure 130. In some embodiments, ground-facing structure 130 can comprise an outsole. In some embodiments, the outsole can be a separate component attached to ground-facing surface 134 (for example, via adhesive bonding or heat bonding). In some embodiments, the outsole can be integrally 3D printed with ground-facing surface 134. In some embodiments, ground-facing structure 130 can be formed in whole or in part by beams 202 of outer skin 200 that extend from a lateral or medial side of sole portion 120 to ground-facing surface 134 of sole portion 120. In some embodiments, ground-facing structure 130 can be formed in whole or in part by beams 202 of outer skin 200 that extend from upper portion 160 to ground-facing surface 134 of sole portion 120.

In some embodiments, as shown for example in FIG. 1F, ground-facing structure 130 can comprise one or more outsole portions 132 integrally 3D printed with sole portion 120. In some embodiments, a ground-facing structure 130 can comprise one or more outsole portions 132 integrally 3D printed with continuous beams 202 of outer skin 200 that extend across ground-facing surface 134 of sole portion 120.

Figure 3:
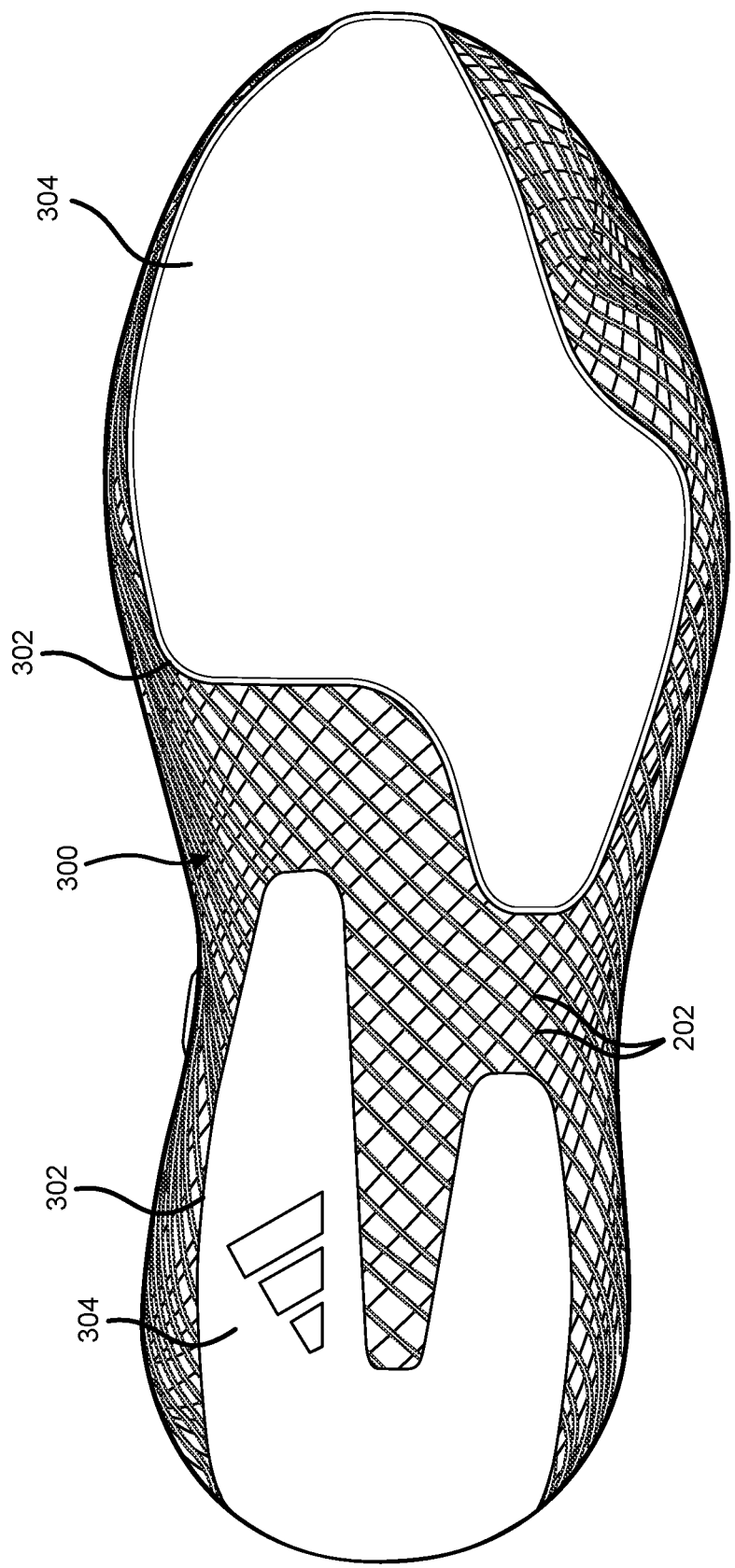
FIG. 3 shows a ground-facing structure according to some embodiments.

In some embodiments, as illustrated in for example FIG. 3, ground-facing structure 130 of sole portion 120 can comprise a ground-facing structure 300 comprising one or more cavities 302 with an outsole material 304 filled within the one or more cavities 302. In such embodiments, the one or more cavities 302 can be integrally 3D printed with sole portion 120. In some embodiments, the one or more cavities 302 can be integrally 3D printed with continuous beams 202 of outer skin 200 that extend across ground-facing surface 134 of sole portion 120.

Figure 4:
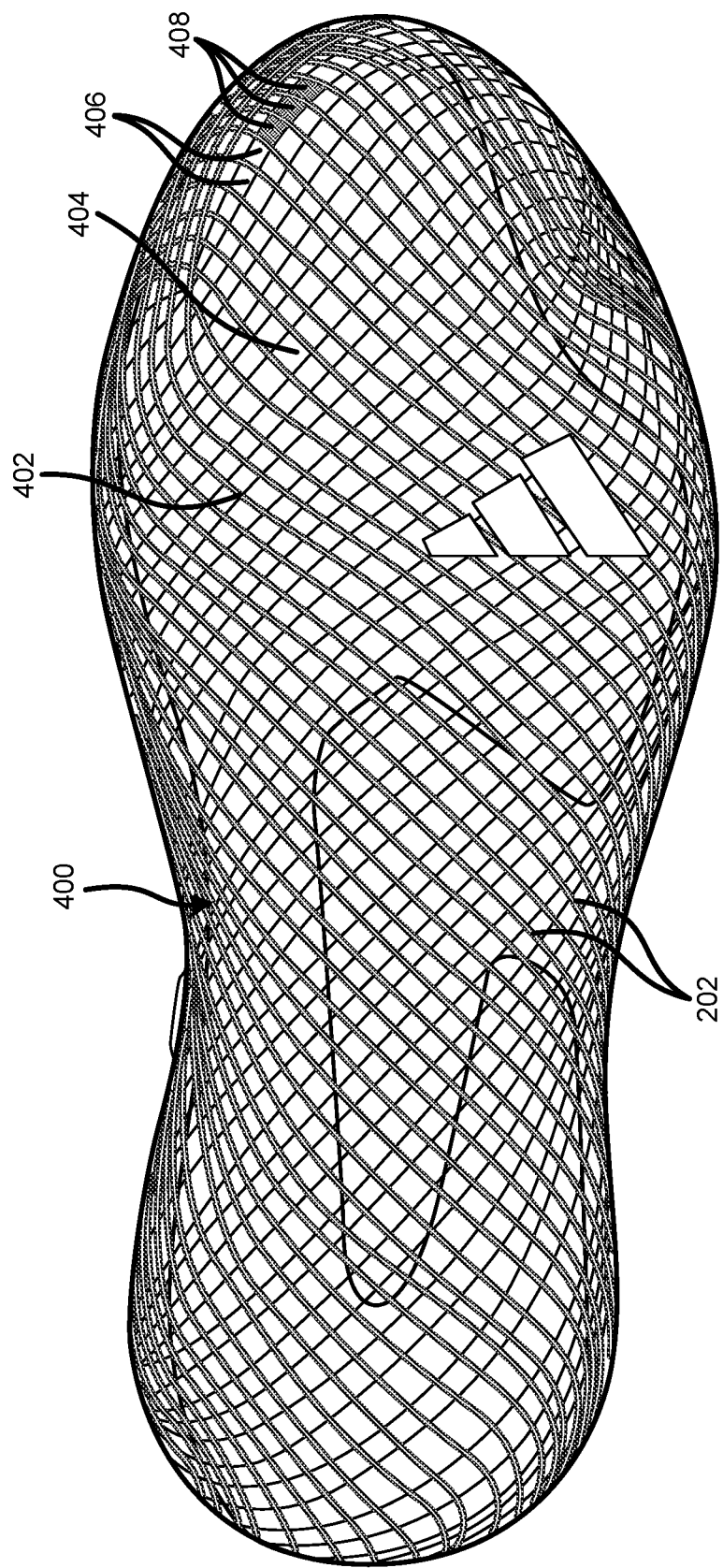
FIG. 4 shows a ground-facing structure according to some embodiments.

In some embodiments, as illustrated in for example FIG. 4, ground-facing structure 130 of sole portion 120 can comprise a ground-facing structure 400 comprising one or more regions 402 where space 204 between a plurality of beams 202 of outer skin 200 is filled with a film 404 that forms cavities 406 between adjacent beams 202 extending across ground-facing surface 134 of sole portion 120. In such embodiments, the cavities 406 can be filled with an outsole material 408. In some embodiments, film(s) 404 can comprise a thickness less than the thickness of beams 202 to create cavities 406 between adjacent beams 202.

Exemplary outsole materials for ground-facing structure 300 and ground-facing structure include 400 include, but are not limited to, a rubber, ethyl vinyl acetate (EVA), a thermoplastic elastomer, a polyurethane, a thermoplastic polyurethane (TPU), a thermoplastic rubber (TPR), and a polyolefin, for example polyethylene (PE), polystyrene (PS), polypropylene (PP), a polyether block amide (PEBA), an expanded polyether block amide (ePEBA) an elastomeric polyurethane (EPU), an expanded elastomeric polyurethane (eEPU), polyamides (nylon), a combination of any of these materials, or a foam comprising one or more of these materials. Additional exemplary materials include carbon and carbon allotropes, such as graphene, carbon nanotubes, and carbon fibers, fiber reinforced polymers, biological materials such as Mycelium, and metals, such as aluminum, steel, or titanium.

Figure 5:
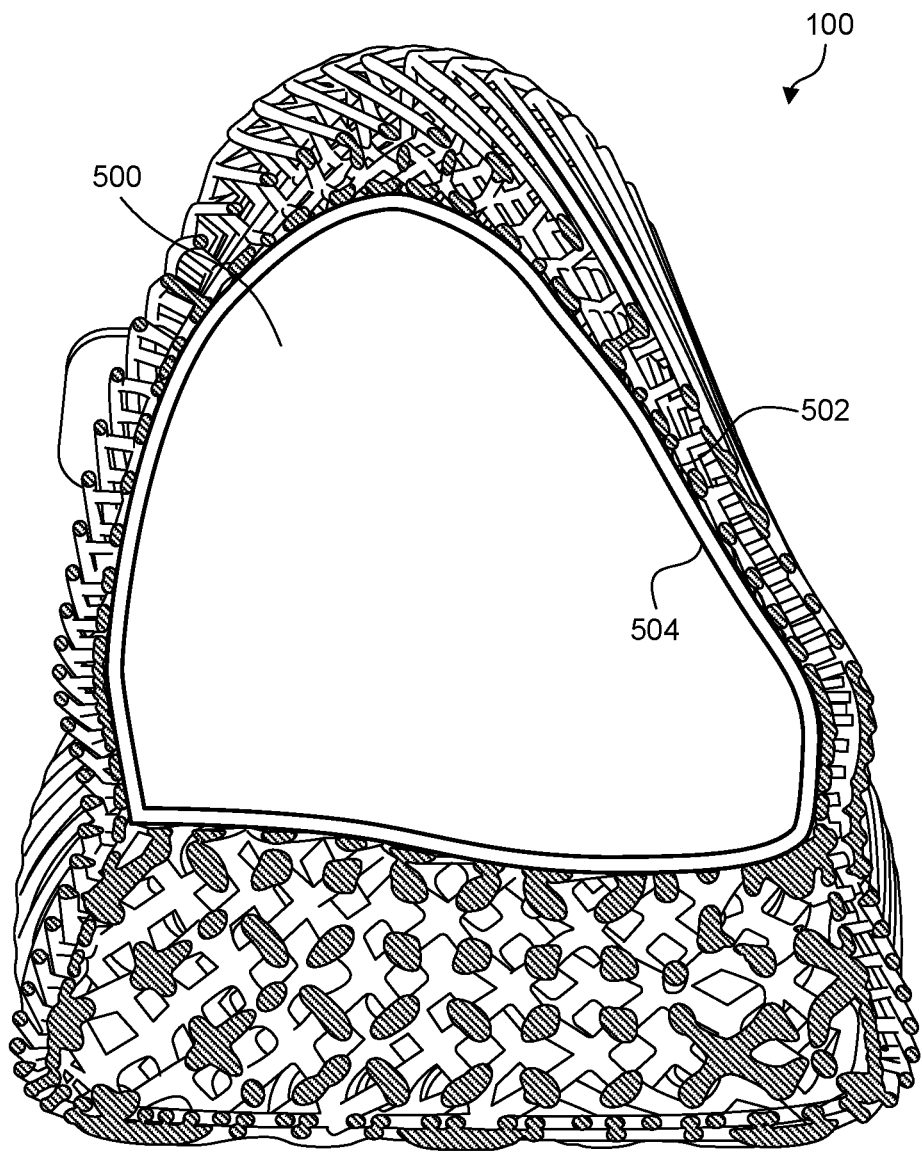
FIG. 5 shows an article of footwear comprising a sock bootie according some embodiments.

In some embodiments, as shown for example in FIG. 5, article of footwear 100 can comprise a sock bootie 500. In such embodiments, sock bootie 500 can comprise an inner surface 504 defining a space for receiving a wearer's foot and an outer surface 502 opposite the inner surface 504. In some embodiments, sock bootie 500 can be directly or indirectly coupled to inner skin 240, midsole 140, or both. In embodiments comprising insole skin 156, sock bootie 500 can be directly or indirectly coupled to insole skin 156.

In some embodiments, outer surface 502 of sock bootie 500 can be mechanically coupled to inner skin 240 by, for example, an adhesive or stitching. Additionally or alternatively, outer surface 502 of sock bootie 500 and inner skin 240 can be frictionally coupled together. In such embodiments, interior surface 250 of inner skin 240 can comprise a texture configured to engage with a corresponding texture on outer surface 502 of sock bootie 500.

Figure 6:
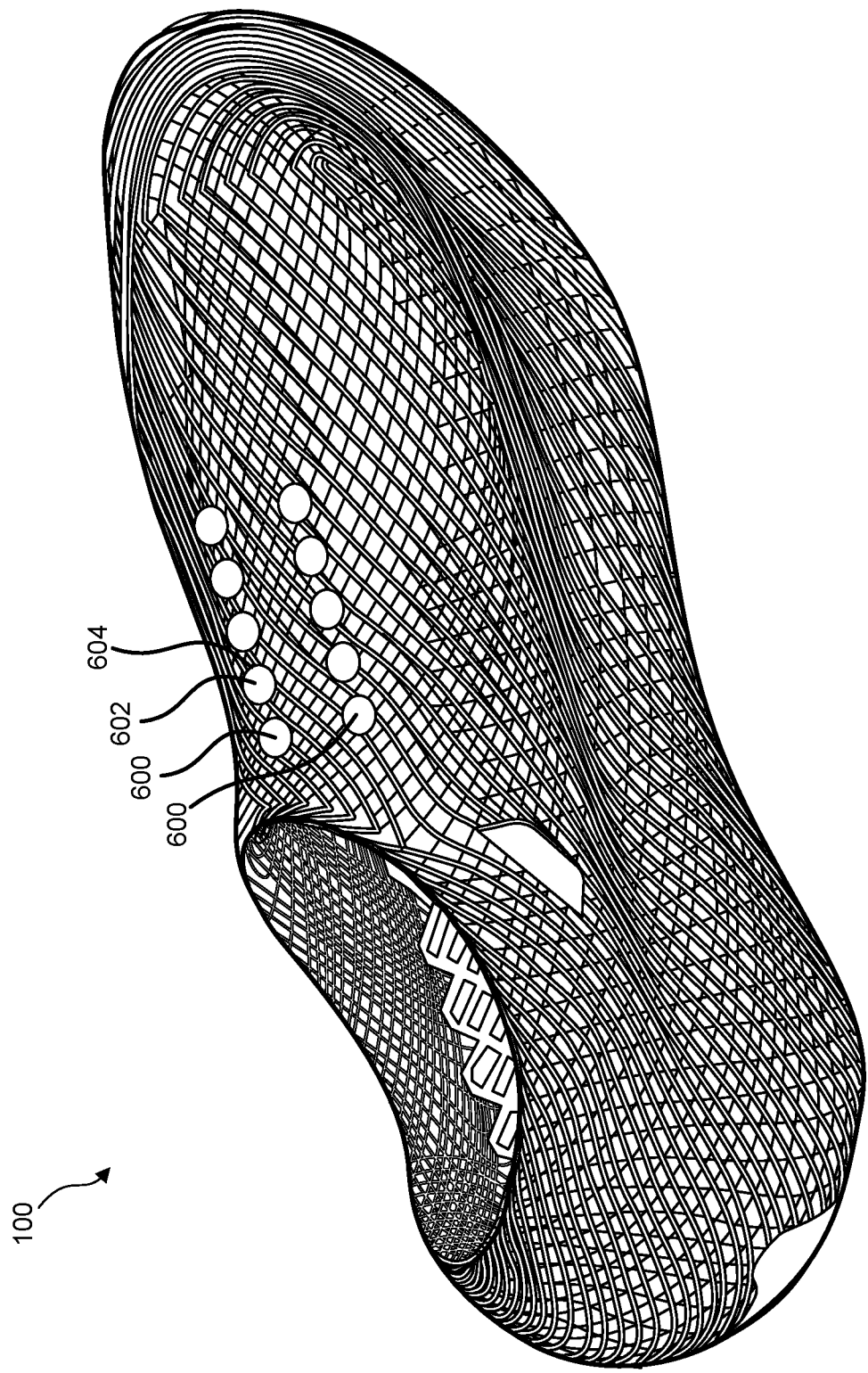
FIG. 6 shows an article of footwear comprising lace structures according to some embodiments.

In some embodiments, as shown for example in FIG. 6, upper portion 160 of footwear 100 can comprise a plurality lace structures 600 formed in the upper portion 160. In some embodiments, lace structures 600 can be integrally 3D printed with upper portion 160.

In some embodiments, each of the lace structures 600 can comprise an opening 602 extending through outer skin 200, core structure 270, and inner skin 240 of upper portion 160. Openings 602 can define an aperture for receiving a shoe lace. In some embodiments, openings 602 can comprise a rim 604 defining an aperture for receiving a shoe lace. In such embodiments, rim 604 can comprise any of the same characteristics described herein for rim 184 of collar 180. For example, continuous beams 202 can intersect rim 604 at an angle of less than 45 degrees, or less than 30 degrees as described herein for continuous beams 202 and rim 184.

Figure 7:
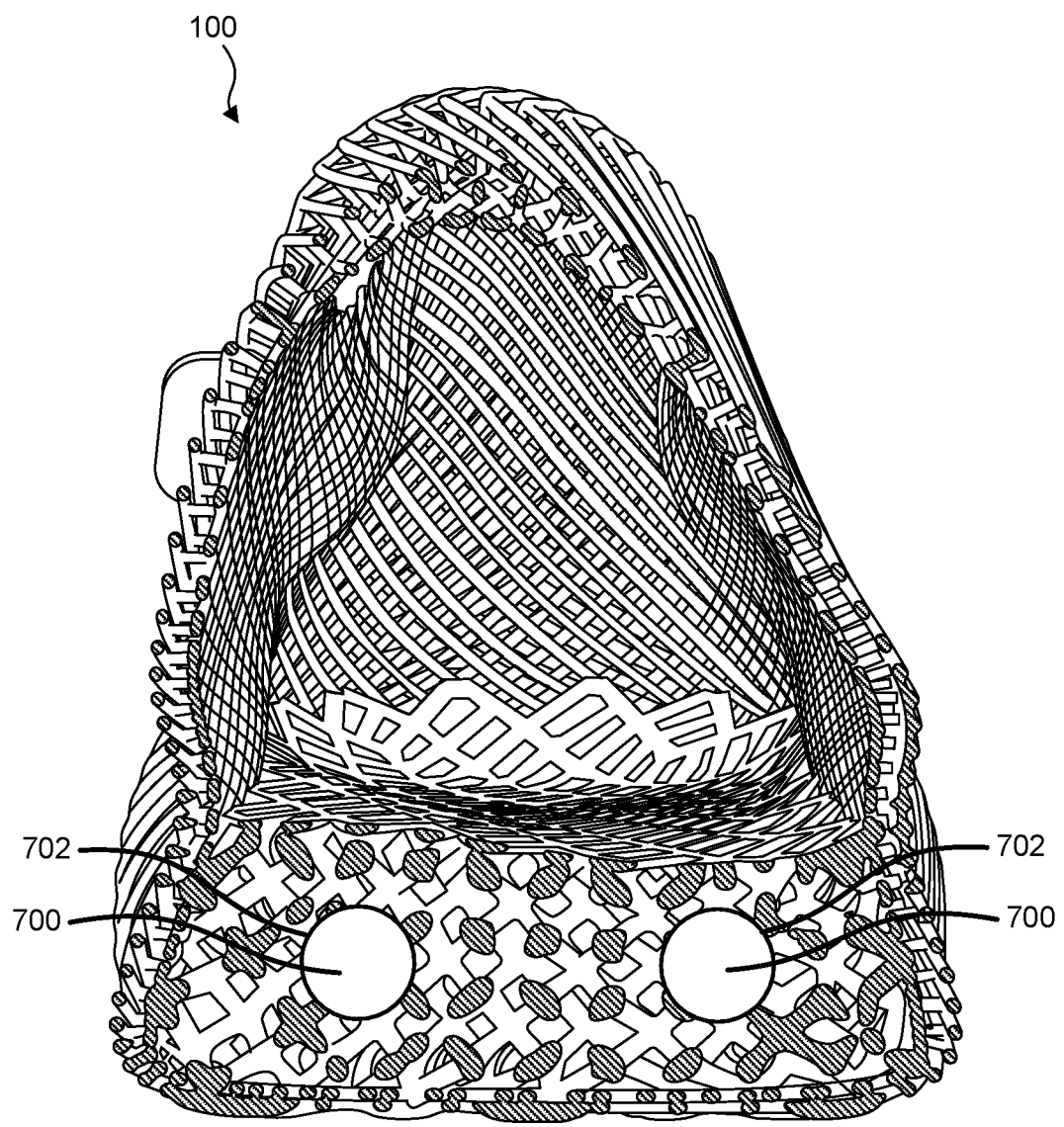
FIG. 7 shows an article of footwear comprising reinforcement structures according to some embodiments.

In some embodiments, as shown for example in FIG. 7, sole portion 120 can comprise one or more reinforcement structures 700. In some embodiments, the reinforcement structure(s) can be disposed within one or more voids 702 formed in sole portion 120. In some embodiments, the one or more voids 702 can be formed in midsole 140. In some embodiments, the one or more voids 702 can be integrally 3D printed with sole portion 120. In some embodiments, one or more voids 702 can be a tube formed in sole portion 120.

In some embodiments, upper portion 160 can comprise one or more reinforcement structures 700. In such embodiments, the reinforcement structure(s) 700 can be disposed within one or more voids 702 formed in upper portion 160. For example, in some embodiments, the one or more voids 702 can be formed in core structure 270 of upper portion 160. In some embodiments, the one or more voids 702 can be integrally 3D printed with upper portion 160.

In some embodiments, reinforcement structure(s) 700 can comprise a shank or torsion bar. In such embodiments, the shank or torsion bar can be made of a nylon polymer or a fiber composite material.

Figure 8:
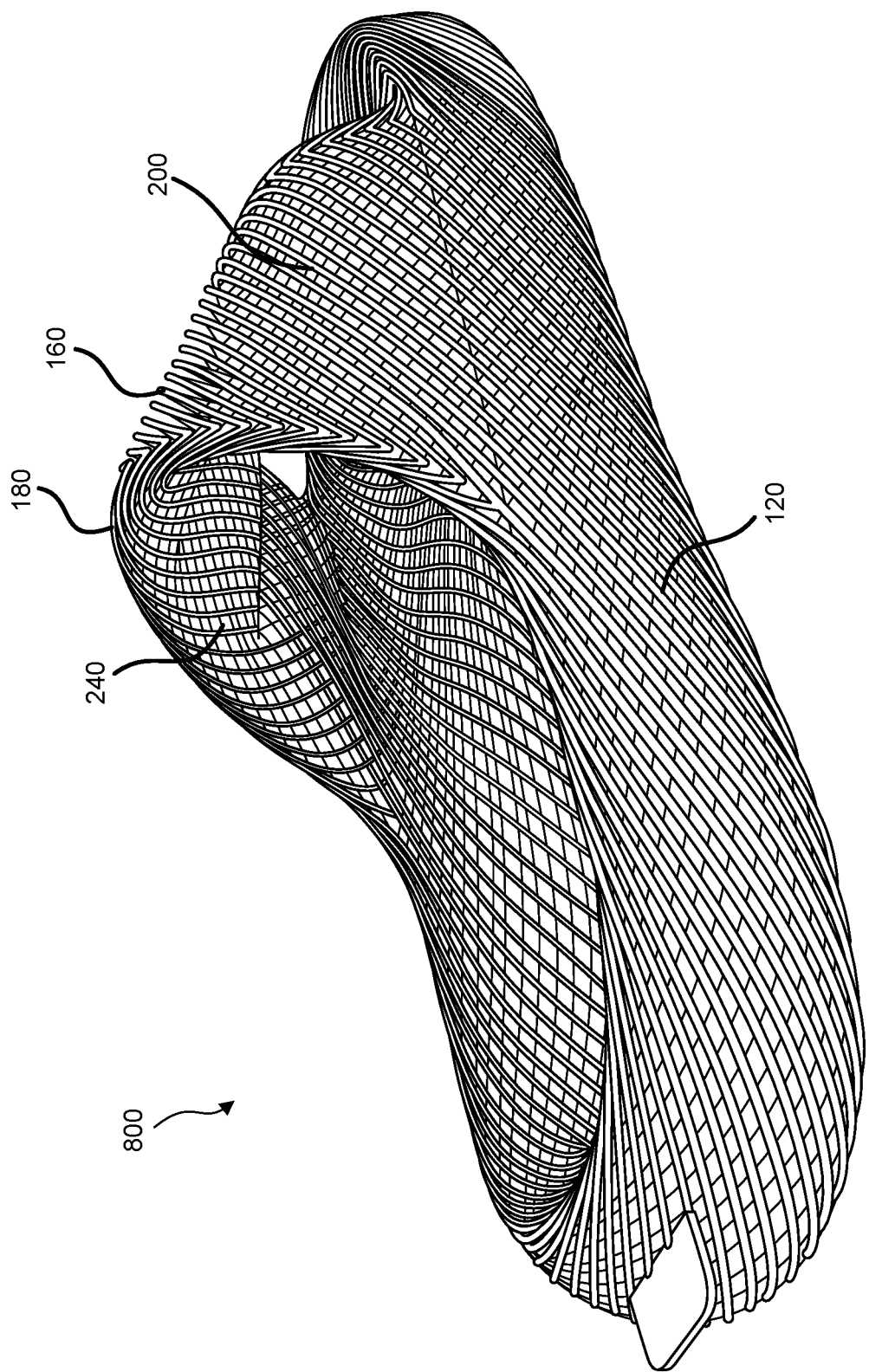
FIG. 8 shows an article of footwear according to some embodiments.

FIG. 8 illustrates an article of footwear 800 in the form a slide sandal according to some embodiments. Article of footwear 800 can comprise sole portion 120 and upper portion 160 in the form of a strap for a slide sandal. As illustrated in FIG. 8, article of footwear 800 can comprise outer skin 200 and inner skin 240. Article of footwear 800 can also comprise any other feature described herein for article of footwear 100, including a core structure 270, an image region 230, and a collar 180.

Figure 9:
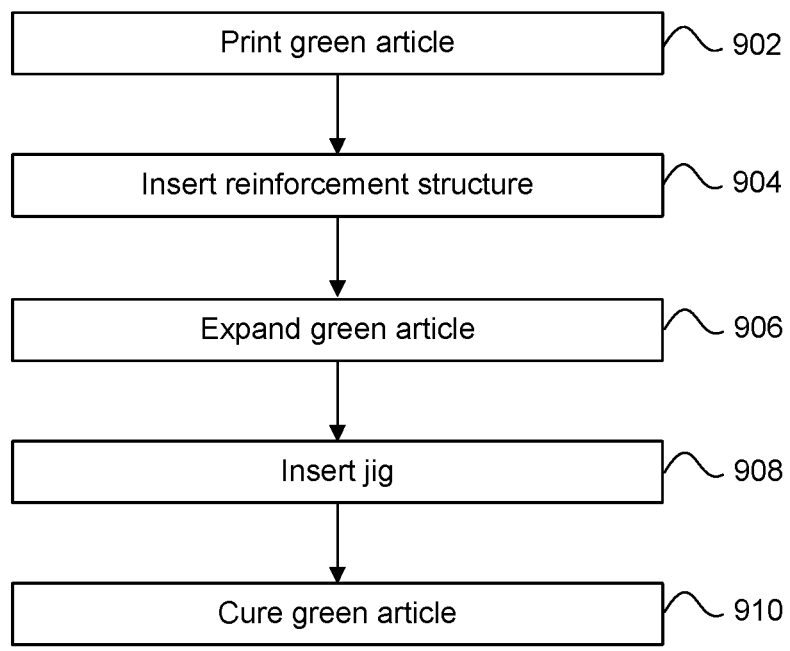
FIG. 9 is a flowchart for a method according to some embodiments.

FIG. 9 illustrates a method of making article of footwear 100 according to some embodiments. Unless stated otherwise, the steps of method 900 need not be performed in the order set forth herein. Additionally, unless specified otherwise, the steps need not be performed sequentially. The steps can be performed in a different order or simultaneously.

First, in step 902, method 900 can comprise printing a green 3D-printed article (for example, article 1010 illustrated in FIG. 10) for article of footwear 100. The green 3D-printed article can comprise any feature of footwear 100 as described herein, as well as any combination of two or more features of footwear 100 as described herein. For example, the green 3D-printed article can comprise a sole portion corresponding to sole portion 120, an upper portion corresponding to upper portion 160, an outer skin corresponding to outer skin 200 and comprising a plurality of continuous beams extending adjacent to each other and defining at least part of an outer contour of the upper portion and at least part of an outer contour of the sole portion, an inner skin corresponding to inner skin 240 and comprising a network of beams defining at least part of an inner contour of the upper portion, and a core structure corresponding to core structure 270 that connects the outer skin to the inner skin and comprises struts that connect beams of the outer skin to beams of the inner skin.

Figure 10:
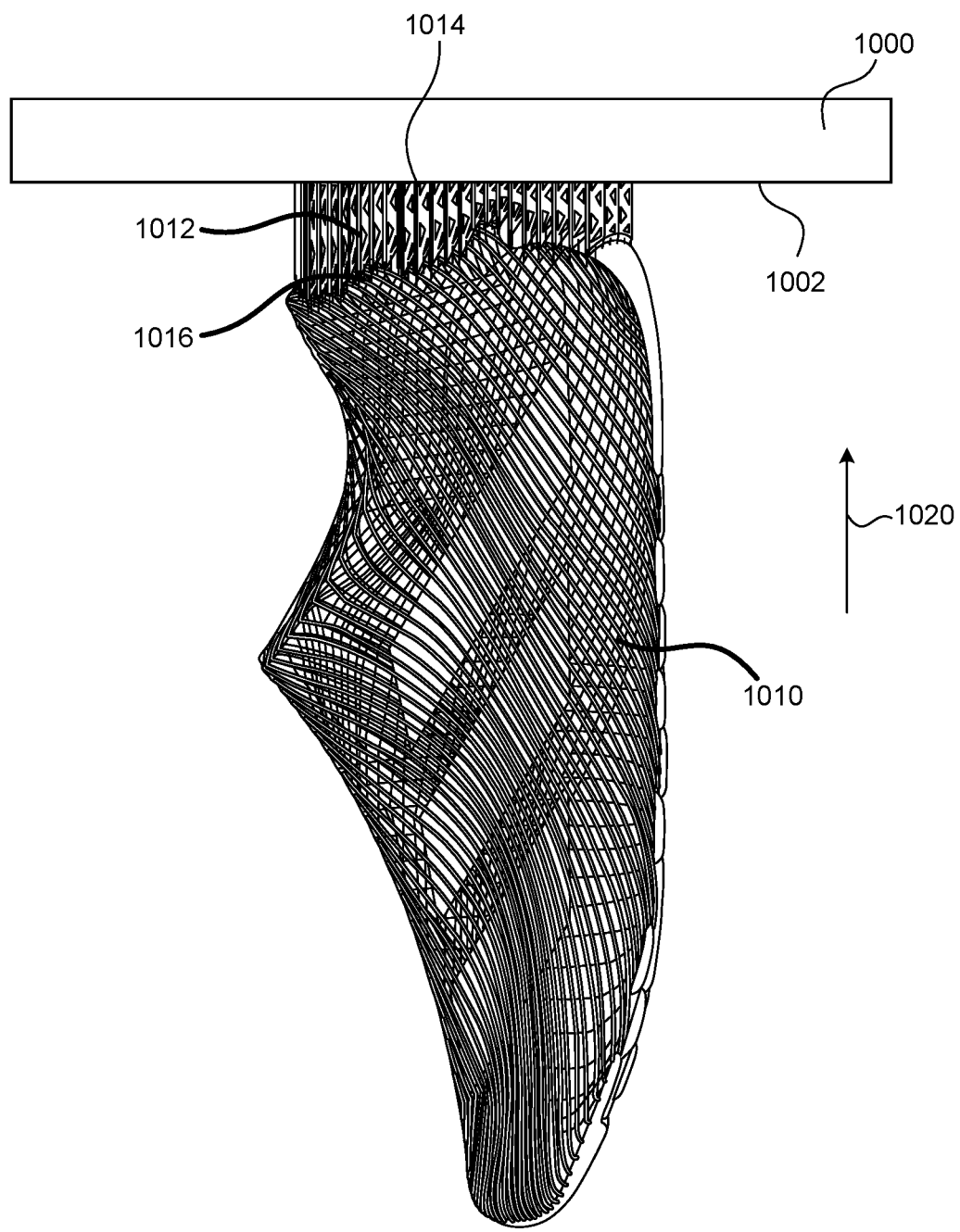
FIG. 10 shows a green article on a build plate according to some embodiments.

In some embodiments, as illustrated in FIG. 10, green 3D-printed article 1010 can be printed on a build surface 1002 of a build plate 1000. In some embodiments, green 3-D printed article 1010 can be printed on build surface 1002 using a continuous liquid interface production process. In such embodiments, green 3-D printed article 1010 is printed by curing liquid resin present in a liquid resin reservoir below build plate 1000 on build surface 1002. And, as build plate 1000 is raised upward in a vertical direction 1020, green 3-D printed article 1010 is printed by curing the liquid resin present in the liquid resin reservoir below build plate 1000. The liquid resin can be cured using light, for example ultraviolet light.

In some embodiments, printing green 3D-printed article in step 902 can comprise printing a support structure 1012 in direct contact with build surface 1002. In such embodiments, support structure 1012 can comprise a first side 1014 in direct contact with build surface 1002 and a second side 1016 in direct contact with the outer skin of green 3D printed article 1010. In embodiments comprising a flat build surface 1002, first side 1014 can be flat. Second side 1016 can follow the outer contour of the outer skin of green 3D printed article 1010. Support structure 1012 can comprise, for example, columns or unit cells that extend from build surface 1002 to the outer skin of green 3D printed article 1010.

Support structure 1012 can be a sacrificial structure discarded after step 902. In some embodiments, support structure 1012 can be removed from (for example, cut from) green 3D printed article after step 902. In some embodiments, support structure 1012 can be removed from (for example, cut from) article of footwear 100 after step 906 or step 910.

In some embodiments, method 900 can comprise inserting one or more reinforcement structures 700 into voids (for example, voids 702) formed in the sole portion and/or the upper portion of green 3D-printed article in step 904.

In step 906, the green 3D-printed article can be expanded into article of footwear 100. In some embodiments, the green 3D-printed article can be heated to expand the 3D-printed article into article of footwear 100. In some embodiments, the green 3D-printed article can be heated to a temperature ranging from greater than or equal to 100° C. to less than or equal to 130° C. to expand the 3D-printed article into article of footwear 100. In some embodiments, the green 3D-printed article can be heated to a temperature ranging from greater than or equal to 110° C. to less than or equal to 120° C. to expand the 3D-printed article into article of footwear 100. Expanding the 3D-printed article in step 906 comprises increasing the volume of the 3D-printed article. In some embodiments, the volume can be increased by at least 10%, by at least 20%, or by at least 50%.

In embodiments comprising step 904, expanding the green 3D-printed article can shrink the voids disposed around the one or more reinforcement structures 700 to secure the reinforcement structure(s) 700 in place. For example, expanding the green 3D-printed article can expand the sole portion of the green article to shrink voids in the sole portion and secure a reinforcement structure 700 within sole portion 120 of article of footwear 100.

After expanding the green 3D-printed article in step 906, the 3D-printed article into article of footwear 100 can be cured in step 910. In some embodiments, article of footwear 100 can be heated to a temperature ranging from greater than or equal to 100° C. to less than or equal to 130° C. to cure the article of footwear 100. In some embodiments, article of footwear 100 can be heated to a temperature ranging from greater than or equal to 110° C. to less than or equal to 120° C. to cure the article of footwear 100.

In some embodiments, before curing in step 910, a jig can be inserted into a foot cavity of article of footwear 100 to support article of footwear 100 during curing and prevent undesired deformation of the foot cavity.

In some embodiments, after curing in step 910, an outsole can be attached to a ground-facing surface of the article of footwear 100. In some embodiments, the outsole can be bonded to the ground-facing surface of the article of footwear 100. In some embodiments, the outsole can be bonded to the ground-facing surface with an adhesive. In such embodiments, adhesive can be applied to the ground-facing surface of the article of footwear 100. After applying the adhesive, the outsole and the article of footwear 100 can be passed through a heat tunnel. In some embodiments, the temperature of the heat tunnel can range from greater than or equal to 50° C. to less than or equal to 70° C. After passing through a heat tunnel, the article of footwear 100 and outsole can be placed into a press to attach the outsole and the article of footwear 100 via the adhesive applied to the ground-facing surface.

Figure 11:
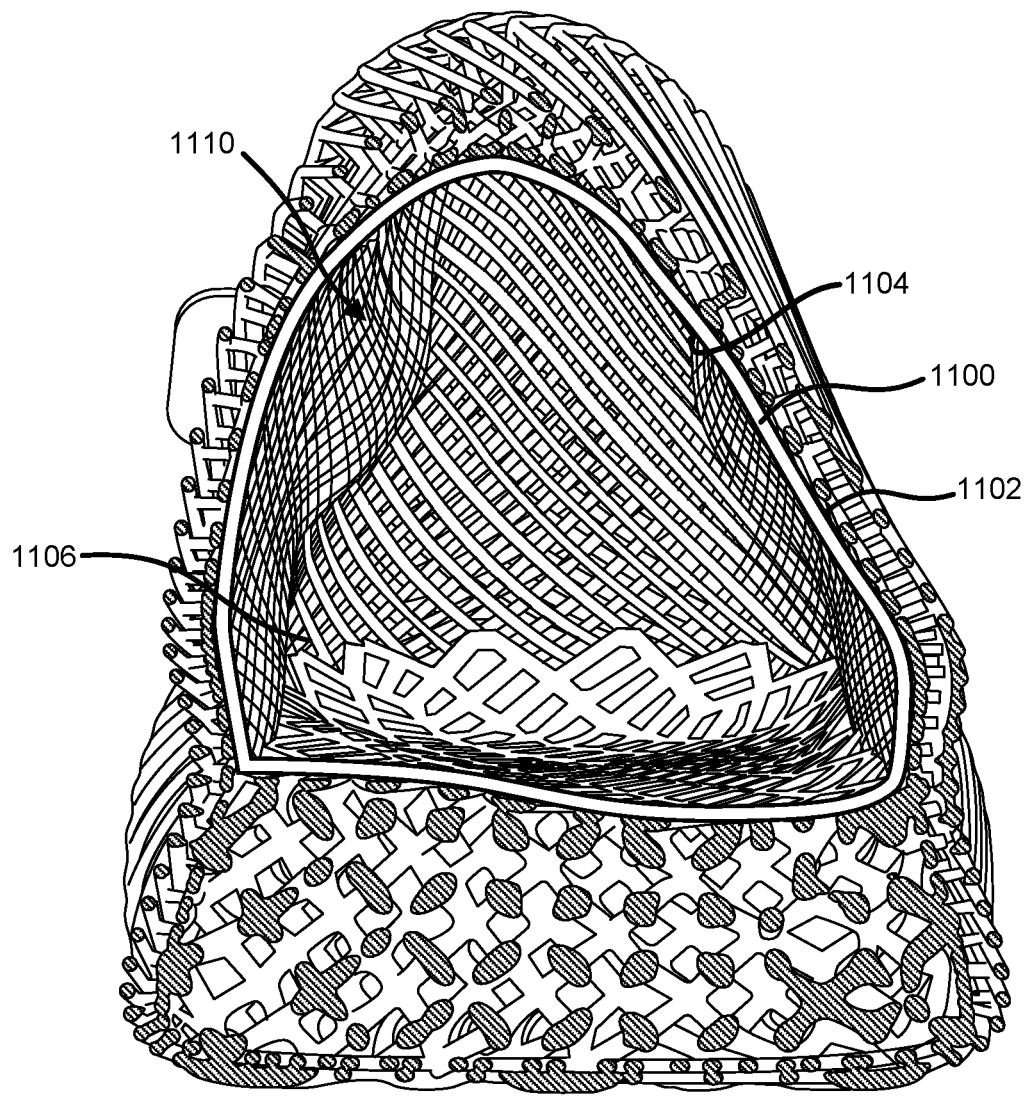
FIG. 11 shows a jig according to some embodiments.

FIG. 11 illustrates an exemplary jig 1100 within a foot cavity 1110 according to some embodiments. In some embodiments, an outer surface 1102 of jig 1100 can support inner skin 240, midsole 140, or both. In embodiments comprising insole skin 156, outer surface 1102 can support insole skin 156. In some embodiments, jig 1100 can comprise a hollow shape comprising a hollow interior 1106 and an inner surface 1104 opposite outer surface 1102.

Where a range of numerical values comprising upper and lower values is recited herein, unless otherwise stated in specific circumstances, the range is intended to include the endpoints thereof, and all integers and fractions within the range. It is not intended that the disclosure or claims be limited to the specific values recited when defining a range. Further, when an amount, concentration, or other value or parameter is given as a range, one or more ranges, or as list of upper values and lower values, this is to be understood as specifically disclosing all ranges formed from any pair of any upper range limit or value and any lower range limit or value, regardless of whether such pairs are separately disclosed.

It is to be appreciated that the Detailed Description section, and not the Summary and Abstract sections, is intended to be used to interpret the claims. The Summary and Abstract sections may set forth one or more but not all exemplary embodiments of the present invention(s) as contemplated by the inventor(s), and thus, are not intended to limit the present invention(s) and the appended claims in any way.

The foregoing description of the specific embodiments will so fully reveal the general nature of the invention(s) that others can, by applying knowledge within the skill of the art, readily modify and/or adapt for various applications such specific embodiments, without undue experimentation, without departing from the general concept of the present invention(s). Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention(s) should not be limited by any of the above-described exemplary embodiments, but should be defined only in accordance with the following claims and their equivalents.

What is claimed is:

1. An article of footwear, comprising:
    a sole portion;
    an upper portion;
    an outer skin comprising a plurality of continuous beams extending adjacent to each other and defining at least part of an outer contour of the upper portion and at least part of an outer contour of the sole portion;
    an inner skin comprising a network of beams defining at least part of an inner contour of the upper portion;
    a core structure that connects the outer skin to the inner skin, the core structure comprising struts that connect beams of the outer skin to beams of the inner skin; and
    a midsole comprising a three-dimensional mesh comprising a plurality of interconnected unit cells, each interconnected unit cell comprising a plurality of unit cell struts defining a three-dimensional structure and a plurality of nodes at which one or more unit cell struts are connected,
    wherein the midsole forms part of the sole portion, and
    wherein the sole portion, the upper portion, the outer skin, the inner skin, the core structure, and the midsole are 3D printed as a single piece.

2. The article of footwear of claim 1, wherein the core structure is disposed around a lateral side and a medial side of the midsole and connects the midsole to the outer skin around the lateral side and the medial side of the midsole.

3. The article of footwear of claim 1, wherein the inner skin is disposed around a lateral side and a medial side of the midsole and connects the midsole to the core structure around the lateral side and the medial side of the midsole.

4. The article of footwear of claim 1, wherein the core structure comprise struts that directly connect a beam of the outer skin to a beam of the inner skin.

5. The article of footwear of claim 1, wherein the core structure comprises a thickness defined as the distance between the outer skin and the inner skin, and wherein the thickness of the core structure varies across different regions of the upper portion.

6. The article of footwear of claim 1, wherein the inner contour of the upper portion comprises an undulating contour that varies relative to the outer contour defined by the outer skin.

7. The article of footwear of claim 6, wherein the undulating contour comprises a first region spaced apart from the outer skin by a first distance and a second region spaced apart from the outer skin by a second distance less than the first distance.

8. The article of footwear of claim 7, wherein a length of the struts of the core structure connecting the outer skin to the inner skin in the first region is greater than a length of the struts connecting the outer skin to the inner skin in the second region.

9. The article of footwear of claim 1, wherein the sole portion comprises a reinforcement structure disposed within a void formed in the midsole.

10. An article of footwear, comprising:
    a sole portion;
    an upper portion;
    an outer skin comprising a plurality of continuous beams extending adjacent to each other and defining at least part of an outer contour of the upper portion and at least part of an outer contour of the sole portion;

an inner skin comprising a network of beams defining at least part of an inner contour of the upper portion; and a core structure that connects beams of the outer skin to beams of the inner skin, wherein the sole portion, the upper portion, the outer skin, the inner skin, and the core structure are 3D printed as a single piece.

11. The article of footwear of claim 10, wherein adjacent beams of the plurality of continuous beams of the outer skin extend substantially parallel to each other.

12. The article of footwear of claim 10, wherein the upper portion comprises a collar defining an opening configured to receive a wearer's foot.

13. The article of footwear of claim 12, wherein a plurality of the continuous beams of the outer skin extend from the collar to the sole portion.

14. The article of footwear of claim 12, wherein the collar comprises a rim defining the opening for receiving a wearer's foot, and wherein the plurality of continuous beams intersect the rim at an angle of less than 45 degrees.

15. The article of footwear of claim 14, wherein the plurality of the beams each comprise a first portion that approaches the rim at an angle ranging from greater than or equal to 45 degrees to less than or equal to 90 degrees, a turn, and a second portion extending from the turn and intersecting the rim at an angle of less than 45 degrees.

16. The article of footwear of claim 10, wherein the sole portion comprises a plurality of interconnected unit cells comprising a solid representation of an implicit surface.

\* \* \* \* \*